(12) United States Patent
Kobayashi et al.

(10) Patent No.: US 9,710,862 B2
(45) Date of Patent: Jul. 18, 2017

(54) ENERGY CONSERVATION ANALYSIS SYSTEM

(75) Inventors: Misayo Kobayashi, Osaka (JP); Ryuichi Maeda, Kanagawa (JP); Tomoya Sogou, Osaka (JP); Yoshifumi Murakami, Osaka (JP); Hiroki Kazuno, Osaka (JP); Hisashi Takayama, Osaka (JP)

(73) Assignee: Panasonic Intellectual Property management Co., Ltd., Osaka (JP)

( * ) Notice: Subject to any disclaimer, the term of this patent is extended or adjusted under 35 U.S.C. 154(b) by 1364 days.

(21) Appl. No.: 13/518,085

(22) PCT Filed: Dec. 21, 2010

(86) PCT No.: PCT/JP2010/072978
§ 371 (c)(1),
(2), (4) Date: Jul. 20, 2012

(87) PCT Pub. No.: WO2011/078155
PCT Pub. Date: Jun. 30, 2011

(65) Prior Publication Data
US 2012/0277924 A1    Nov. 1, 2012

(30) Foreign Application Priority Data
Dec. 21, 2009    (JP) .................................. 2009-289703

(51) Int. Cl.
*G06Q 50/06*    (2012.01)
*G06Q 10/06*    (2012.01)

(52) U.S. Cl.
CPC ............. *G06Q 50/06* (2013.01); *G06Q 10/06* (2013.01)

(58) Field of Classification Search
CPC ............................... G06Q 10/06; G06Q 50/06
(Continued)

(56) References Cited

U.S. PATENT DOCUMENTS 5,344,068 A    9/1994  Haessig
5,555,927 A *  9/1996  Shah ............................. 165/239
(Continued)

FOREIGN PATENT DOCUMENTS

DE    19738819 A1    3/1999
JP    08-050501 A    2/1996
(Continued)

OTHER PUBLICATIONS

Gao, BuildSys Nov. 2009 Conference paper, "The Self-Programming Thermostat: Optimizing Setback Schedules based on Home Occupancy Patterns" 6 pages total.*
(Continued)

*Primary Examiner* — Robert Fennema
*Assistant Examiner* — Jigneshkumar Patel
(74) *Attorney, Agent, or Firm* — Renner, Otto, Boisselle & Sklar, LLP

(57) ABSTRACT

A terminal device sets a beneficial use time slot for regarding the electrical consumption in the beneficial use time slot as the beneficial, a waste use time slot for regarding the electrical consumption in the waste use time slot as the waste, and an efficiency improvement time slot for regarding the electrical consumption in the efficiency improvement time slot as the electrical consumption to be reduced. On the basis of the data of an amount of the electrical consumption of the device to be monitored, calculating an amount of the electrical consumption in each the time slot and displaying an amount of the electrical consumption in each time slot are preformed.

14 Claims, 10 Drawing Sheets

(58) Field of Classification Search
USPC .......................................................... 700/291
See application file for complete search history.

(56) References Cited

U.S. PATENT DOCUMENTS

| | | | |
|---|---|---|---|
| 7,135,956 B2* | 11/2006 | Bartone et al. ................ | 340/3.9 |
| 2009/0302994 A1* | 12/2009 | Rhee et al. .................... | 340/3.1 |
| 2010/0213895 A1* | 8/2010 | Keating et al. ............... | 320/108 |

FOREIGN PATENT DOCUMENTS

| | | | |
|---|---|---|---|
| JP | 2009-180741 A | 8/2009 |
| JP | 2009-245360 A | 10/2009 |
| WO | 2009/151078 A1 | 12/2009 |

OTHER PUBLICATIONS

Extended European Search Report for corresponding European Application No. EP 10 83 9385 dated Oct. 23, 2014.
International Search Report for corresponding International Application No. PCT/JP2010/072978 mailed Mar. 29, 2011.
Form PCT/ISA/237 for corresponding International Application No. PCT/JP2010/072978 dated Mar. 29, 2011.

* cited by examiner

FIG. 5
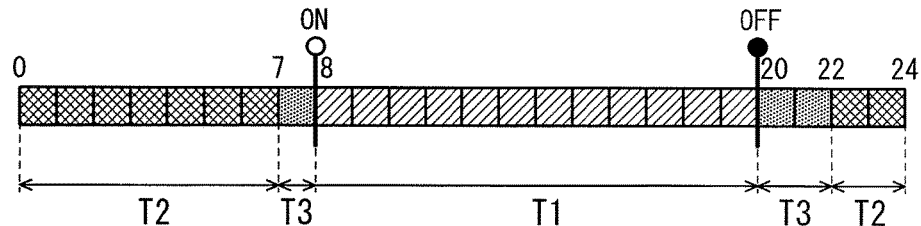
FIG. 6
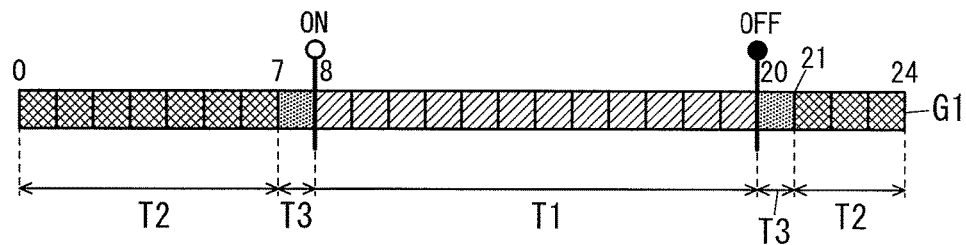
FIG. 7A
| date | ON/OFF information |
|---|---|
| 2009/08/01 6:00 | ON |
| 2009/08/01 21:30 | OFF |
| 2009/08/02 8:30 | ON |
| 2009/08/02 21:00 | OFF |
| 2009/08/03 08:30 | ON |
| 2009/08/03 19:30 | OFF |
| 2009/08/04 6:00 | ON |
| 2009/08/04 24:00 | OFF |
| 2009/08/05 0:00 | ON |
| 2009/08/05 19:00 | OFF |
| 2009/08/06 7:00 | ON |
| 2009/08/06 19:30 | OFF |
| 2009/08/07 8:30 | ON |
| 2009/08/07 21:00 | OFF |
| : | : |
| : | : |
FIG. 7B
| date | start time difference | finish time difference |
|---|---|---|
| 2009/08/01 | 2 | 1.5 |
| 2009/08/02 | 0 | 1 |
| 2009/08/03 | 0 | 0 |
| 2009/08/04 | 2 | 4 |
| 2009/08/05 | 8 | 0 |
| 2009/08/06 | 1 | 0 |
| 2009/08/07 | 0 | 1 |
| : | : | : |
| : | : | : |

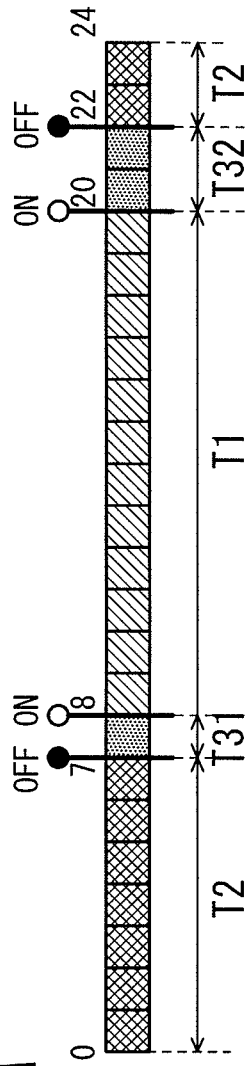
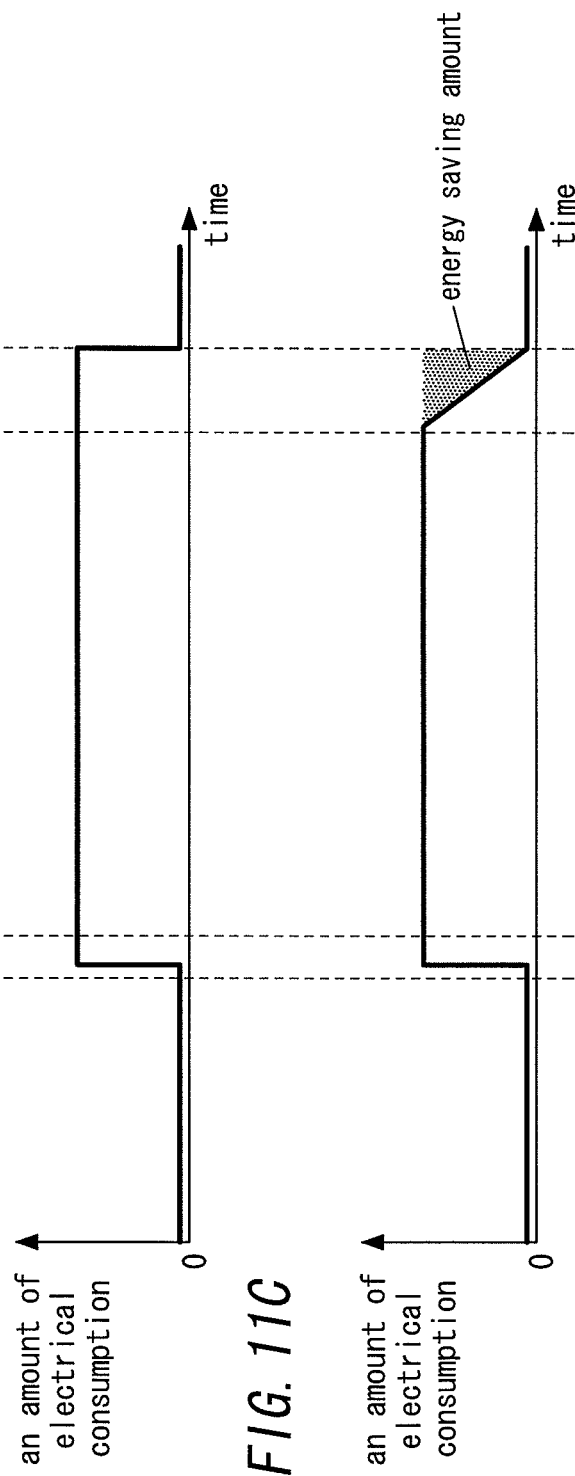
FIG. 11A
FIG. 11B
FIG. 11C

ENERGY CONSERVATION ANALYSIS SYSTEM

TECHNICAL FIELD

This invention relates to an energy conservation analysis system.

BACKGROUND ART

Conventional energy conservation analysis system is configured to collect the data of usage of the electricity (in other words, resource usage amount) from the electrical device (in other words, the device to be monitored) in the building and the plant. In addition, the conventional energy conservation analysis system is also configured to collect the data of the environmental information of the temperature and the humidity and the control information of each the device. The conventional energy conservation analysis system is configured to count the collected data on a predetermined period basis. (The predetermined period basis is, such as a daily basis, a month basis, and a year basis.) The conventionally energy conservation analysis system is configured to display the graph such as line chart and the bar chart which indicate an amount of electricity consumption.

CITATION LIST

PATENT LITERATURE 1: Japanese patent application publication No. 8-50501 A

SUMMARY OF INVENTION

Problem to Solve

The above explained conventional energy conservation analysis system displays the graph indicating the collected numerical value. Therefore, it is difficult to grasp the actual condition of the operation. So, the manager who has a familiarity of the energy conservation technology and has a sufficient knowledge has to judge whether the resource such as the electricity and the gas is waste or not, exactly.

In addition, in a case where the electrical devices are operated according to predetermined control schedule information, there is a need to judge whether the control schedule is appropriately set or not by the manager having the sufficient knowledge.

This invention is achieved in view of the above. An objective of this invention is to produce the energy conservation analysis system which makes it possible for the manager having inadequate knowledge to adequately judge whether the device wastes the resource or not.

Solution to Problem

This invention discloses an energy conservation analysis system being configured to monitor the device to be monitored which operates according to the control schedule information.

The energy conservation analysis system comprises a resource usage information acquisition means, a time slot setting means, the resource usage condition judgment means, and a display means. The resource usage information acquisition means is configured to acquire the resource usage information including an amount of the resource consumption in association with use time in the device to be monitored which operates according to the control schedule information. The time slot setting means is configured to set three or more time slot of a beneficial use time slot, a waste use time slot, and an efficiency improvement time slot. The beneficial use time slot is provided for regarding the use of the resource in the beneficial use time slot by the device to be monitored as the beneficial use of the resource. The waste use time slot is provided for regarding the use of the resource in the waste use time slot by the device to be monitored as the waste use of the resource. The efficiency improvement is provided for regarding the use of the resource in the efficiency improvement time slot by the device to be monitored as the resource use to be reduced. The resource usage condition judgment means is configured to calculate an amount of the consumption of the resource in each the time slot which is set by the time slot setting means. The display means is configured to display an amount of the consumption of the resource in each time slot which is calculated by the resource usage condition judgment means.

According to this invention, the result of an amount of consumption of the resource is displayed in addition to each the time slot of the beneficial use time slot, the waste use time slot, and the efficiency improvement time slot. Therefore, it is possible to make the user aware of whether or not the resource is used efficiently and whether or not the resource is wasted. That is, the manager is able to judge the use of the resource in the beneficial use time slot is an adequate use and the use of the resource in the waste use time slot is waste. Furthermore, the system comprises the efficiency improvement time slot for regarding an amount of the consumption of the resource by the device to be monitored as an amount of the consumption of the resource to be reduced. Employing the time slot for improvement of the operational efficiency makes it possible for the manager having little knowledge to analyze the energy conservation while being aware of the time slot for improvement of the operational efficiency. Therefore, the manager is able to improve the control schedule with his intense and is able to achieve the energy conservation. In addition, according to setting each the time slot of the beneficial use time slot, the waste use time slot, and the efficiency improvement time slot, the manager exactly grasp the usage condition of the resource, whereby it is possible to prevent the misestimation of estimating the waste resource consumption to too much or estimating the waste resource consumption to too low. Therefore, this configuration makes it possible for the manager to find the problem to be improved in the control schedule, exactly. That is, the manager makes it possible to exactly judge whether or not the device to be monitored waste the resource.

The time slot setting means is preferably configured to apply the time slot setting rule to the obtained control schedule information to set each the time slot.

According to this, on the basis of the control schedule information, it is possible to set each the time slot of the beneficial use time slot, the waste use time slot, and the efficiency improvement time slot without additional works of the manager.

Preferably, the time slot setting means is configured to apply a predetermined time slot setting rule to both the obtained control schedule information and the resource usage information obtained by the resource usage information acquisition means to set each the time slot.

With this configuration, on the basis of both the control schedule information of the device to be monitored and the actual usage condition of the device to be monitored, the beneficial use time slot, the waste use time slot, and the efficiency improvement time slot are automatically set without additional work of the manager. Therefore, regardless of the professional skill of the manager, it is possible to adjust each the time slot, adequately. Therefore, this configuration makes it possible for the manager to exactly grasp the usage condition of the resource, exactly, and to judge whether or not the usage of the resource is beneficial.

It is preferred that the system further comprises the control schedule creating means being configured to apply the predetermined schedule setting rule to the setting condition in each time slot to create the control schedule information.

According to this, the schedule setting rule is applied to the setting condition of each time slot to create and improve the control schedule. Therefore, without additional work of the manager, the control schedule is automatically created.

It is preferred that, when the device to be monitored is operated according to the control schedule information having no control content of starting or finishing the operation of the device in at least one of the start time and the finish time of the efficiency improvement time slot, the control schedule creating rule is a rule "of applying the control content of finishing the operation of the device to be monitored in at least one of the start time and the finish time" to the control schedule information.

According to this, it is possible to automatically create the control schedule which is set to achieve the energy conservation without additional work of the manager.

It is preferred that the control schedule creating means is configured to apply "the predetermined schedule setting rule" to both "the setting condition in each the time slot" and "the resource usage information acquired by the resource usage information acquisition means" to create the control schedule information.

With this configuration, the control schedule is updated to improve the energy conservation with consideration of the usage condition of the device to be monitored.

It is preferred that, when "the efficiency improvement time slot is set between the beneficial use time slot and the waste use time slot" and "the device to be monitored is operated according to the control schedule information having the control content of finishing the operation of the device to be monitored in at least one of the start time and the finish time of the efficiency improvement time slot", the control schedule creating means creates the control schedule information which includes the waste use time slot with extension period by varying the time of finishing the device to be monitored in the efficiency improvement time slot from one of the times. When the device to be monitored is finished its operation by a user's operation within the extension period of the waste use time slot under a condition where the device to be monitored is operated according to the created control schedule information, the control schedule creating means further extends the extension period by varying the time for finishing the operation of the device to be monitored within the efficiency improvement time slot. When the device to be monitored is finished its operation by the user's operation within the extension period of the waste use time period under a condition where the device to be monitored is operated according to the control schedule information, the control schedule creating means shortens the waste use time slot by varying the time for finishing the operation of the device to be monitored within the efficiency improvement time slot.

According to this invention, the control schedule is improved to achieve the energy conservation in line with the usage condition of the device to be monitored. Therefore, it is possible to achieve the improvement of the energy conservation. In addition, this configuration has an advantageous in view of the upper limit of the registration value of the control schedule and the actual comfort, Preferably, when the control schedule information includes the control content of finishing the operation of the device to be monitored at the finish time of the efficiency improvement time slot, the control schedule creating means is configured to create the control schedule information of operating the device to be monitored such that the an amount of the consumption of the resource in the efficiency improvement time slot is gradually decreasing.

According to this, the control schedule is improved to achieve the energy conservation in the efficiency improvement time slot. Therefore, it is possible to achieve the energy conservation within the efficiency improvement time slot.

Preferably, the resource usage condition judgment means is configured to calculate the difference of a maximum amount of the consumption of the resource which is usable within the efficiency improvement time slot and an actual amount of the consumption of the resource within the efficiency improvement time slot. The display means is configured to display the calculated difference of them.

According to this, an amount of the reduction of the consumption of the resource is displayed. Therefore, it is possible to enhance the consciousness of the energy conservation. Therefore, it is possible to raise the awareness regarding the energy conservation.

Preferably, on the basis of the resource usage information, the resource usage information judgment means is configured to evaluate whether or not an amount of the consumption of the resource within the efficiency improvement time slot. The display means is configured to display the evaluation result.

According to this, an amount of the waste consumption of the resource in the efficiency improved time slot is displayed. Therefore, the manager is able to judge the waste control content in the efficiency improvement time slot. Therefore, it is possible to find the problem to be improved regarding the control schedule.

Preferably, the time slot setting means is configured to set the necessary use time slot which is regarded as the period when the device to be monitored must use the resource. The resource usage condition judgment means is configured to calculate an amount of the consumption of the resource within the necessary use time slot on the basis of the resource usage information. When the calculated amount of the consumption of the resource is below the threshold value, the resource usage condition judgment means judges the fact that the device to be monitored is not used. The display means is configured to display the judgment result.

According to this, even if the manager creates the error control schedule for reducing the consumption of the necessary resource by finishing the operation of the operation necessary device to be monitored such as the signboard in the night and the emergency light due to chasing the energy conservation, the error is detected and informed to the manager.

Preferably, the system preferably comprise the control schedule creating means being configured to create the control schedule information of starting the operation of the device to be monitored in at least the start time of the necessary use time slot when the device to be monitored is operated according to the control schedule information having no control content of at least the start time of the necessary use time slot.

According to this, the control schedule allows the operation necessary device to be monitored to operate within the necessary use time slot. Therefore, the device to be monitored is improved its operation appropriately.

The system preferably comprises the schedule input means and the schedule judgment means. The schedule input means is provided for creating the control schedule information by an operator. The schedule judgment means is configured to judge "the matching of the created control schedule information" and "the setting condition in each the time slot". The display means is configured to display the judgment result of the schedule judgment means.

According to this, the manager is able to find the error of the created control schedule. Therefore, it is possible to operate the device to be monitored appropriately.

It is preferred that the control schedule has a start planning time for starting the operation of the device to be monitored and a finish planning time for finishing the operation of the device to be monitored. The time slot setting rule has a rule of setting a period from after the start planning time to before the finish planning time as the beneficial use time slot. The time slot setting rule has a rule of setting a period from after the finish planning time to before the start planning time as the waste use time slot. The time slot setting rule has a rule of setting the period other than the beneficial use time slot and the waste use time slot as the efficiency improvement time slot.

The control schedule preferably has a start planning time for starting the operation of the device to be monitored and a finish planning time for finishing the operation of the device to be monitored. The time slot setting rule has a rule of setting a period from after a start planning time to before the finish planning time as the beneficial use time slot. The time slot setting rule has a rule of setting a period from a first time after a certain period of the start planning time to the start planning time as the first efficiency improvement period. The time slot setting rule has a rule of setting a period from the finish planning time to a second time before a certain period of the finish planning time as a second efficiency improvement period. The time slot setting rule has a rule of setting the first efficiency improvement period and the second efficiency improvement period as the efficiency improvement time slot. The time slot setting rule has a rule of setting a period other than the beneficial use time slot and the efficiency improvement time slot as the waste use time slot. Consequently, the time slot setting means sets the beneficial use time slot, the waste use time slot, and the efficiency improvement time slot.

It is preferred that the time slot setting rule is a rule of setting a period from the start planning time to the finish planning time next to the start planning time as the beneficial use time slot.

It is preferred that the time slot setting rule has a rule of setting a period from the first time after a certain period of the start planning time to the start planning time next to the first time as the first efficiency improvement period.

It is preferred that the time slot setting rule has a rule of setting a period from "the finish planning time" to "the second time which is next to the finish planning time and which is after a certain period of the finish planning time" as the second efficiency improvement period.

It is preferred that the control schedule has a start planning time for starting the device to be monitored and the finish planning time for finishing the device to be monitored. The time slot setting means is configured to determine a standard start time on the basis of a previous start time. The previous start time indicates the time when the device to be operated is started in past times. The time slot setting means is configured to determine the standard finish time on the basis of the previous finish time. The previous finish time indicates a time when the device to be operated is finished in past times. The time slot setting rule has a rule of setting a period from the standard start time to the start planning time as the first efficiency improvement period. The time slot setting rule has a rule of setting a period from the finish planning time to the standard finish time as the second efficiency improvement period. The time slot setting rule has a rule of setting the first efficiency improvement period and the second efficiency improvement period as the efficiency improvement time slot. The time slot setting rule has a rule of setting a period other than the beneficial use time slot and the efficiency improvement time slot as the waste use time slot. Consequently, on the basis of the control schedule information, the beneficial use time slot, the waste use time slot, and the efficiency improvement time slot are set.

It is preferred that the time slot setting means is configured to set the previous start time on the basis of the resource usage information. The time slot setting means is configured to set the previous finish time on the basis of the resource usage information.

It is preferred that the time slot setting means is configured to determine the previous start time when an amount of the consumption of the resource exceeds the threshold. The time slot setting means is configured to determine the previous finish time when an amount of the consumption of the resource falls below the threshold.

It is preferred that the time slot setting means is configured to determine the standard start time on the basis a plurality of the previous start times. The time slot setting means is configured to determine the standard finish time on the basis of the previous finish times.

The standard start time is preferably set to a time between the earliest start time among the previous start times and the latest start time among the previous start times.

The standard finish time is preferably set to a time between the earliest finish time among the previous finish times and the latest finish time among the previous finish times.

The system preferably comprises a sending means being configured to send "the control schedule information created by the control schedule creating means" to "the device to be monitored".

It is preferred that the time slot setting rule is a rule of setting a first efficiency improvement period which is defined by a period between "after the waste use time slot" to "before the beneficial use time slot". The time slot setting means is preferably set the first efficiency improvement period as the efficiency improvement time slot.

It is preferred that the control schedule setting rule is a rule of setting the control content of finishing the operation of the device to be monitored within the first efficiency improvement period to the control schedule information, under a condition where the device to be monitored is operated according to the control schedule information having no control content of finishing the operation of the device to be monitored within the first efficiency improvement period.

It is preferred that the control schedule setting rule is a rule of setting the control content of finishing the operation of the device to be monitored at the start time to the control schedule information under a condition where the device to be monitored is operated according to the control schedule information has no control content of finishing the operation of the device to be desired at the start time of the first efficiency improvement period.

It is preferred that the control schedule setting rule is a rule of setting a plurality of control contents of finishing the operation of the device to be monitored within the first efficiency improvement period to the control schedule information, under a condition where the device to be monitored is operated according to the control schedule information having no control content of finishing the operation of the device to be monitored within the first efficiency improvement period.

It is preferred that the time slot setting rule is a rule of setting a second efficiency improvement period which is defined by a period between "from after a beneficial use time slot" and "to before the waste use time slot". The time slot setting means is configured to set the second efficiency improvement period as the efficiency improvement time slot.

It is preferred that the control schedule setting rule is a rule of setting a control content of finishing the operation of the device to be monitored to the control schedule information, under a condition where the device to be monitored is operated according to the control schedule information having no control content of finishing the operation of the device to be monitored within the second efficiency improvement period.

It is preferred that the control schedule setting rule is a rule of setting the control content of finishing the operation of the device to be monitored at the finish time to the control schedule information, under a condition where the device to be monitored is operated according to the control schedule information having no control content of finishing the operation of the device to be monitored at the finish time of the second efficiency improvement period.

It is preferred that the control schedule setting rule is a rule of setting a plurality of the control content of finishing the device to be monitored within the second efficiency improvement period to the control schedule information, under a condition where the device to be monitored is operated according to the control schedule information having no control content of finishing the operation of the device to be monitored within the second efficiency improvement period.

Advantageous Effects of Invention

As explained above, this invention makes it possible to provide the effect of allowing the manager having little knowledge to judge whether or not the device to be monitored waste the resource.

BRIEF DESCRIPTION OF DRAWINGS

FIG. 5 shows an illustration showing the manual setting of the time slot of the above.

FIG. 6 shows an illustration of the automatic setting of the time slot of the above.

FIG. 7 A shows an illustration of a construction of the on-off information of the above.

FIG. 7 B shows an illustration of the time difference information of the above.

FIG. 11 A to FIG. 11 C shows illustrations each indicating the control content in the efficiency improvement time slot of the control schedule of the above.

DESCRIPTION OF EMBODIMENTS

Hereinafter, the embodiments of this invention are explained with attached figures.

First Embodiments

This embodiment is explained in a case where the energy conservation analysis system is, for example, used for managing an amount of the electrical consumption of the lighting devices and the air conditioners in the restaurant. (An amount of the electrical consumption is, in other words, an amount of the consumption of the resource. The lighting devices and the air conditioners are, in other words, the devices to be monitored.) However, the energy conservation analysis system may be used as the system for managing an amount of the electrical consumption of the devices to be monitored in the building such as the supermarket and the business place. In addition, the energy conservation analysis system may monitor an amount of the electrical consumption of the electrical device other than the devices to be monitored such as the lighting device and the air conditioner.

Figure 1:
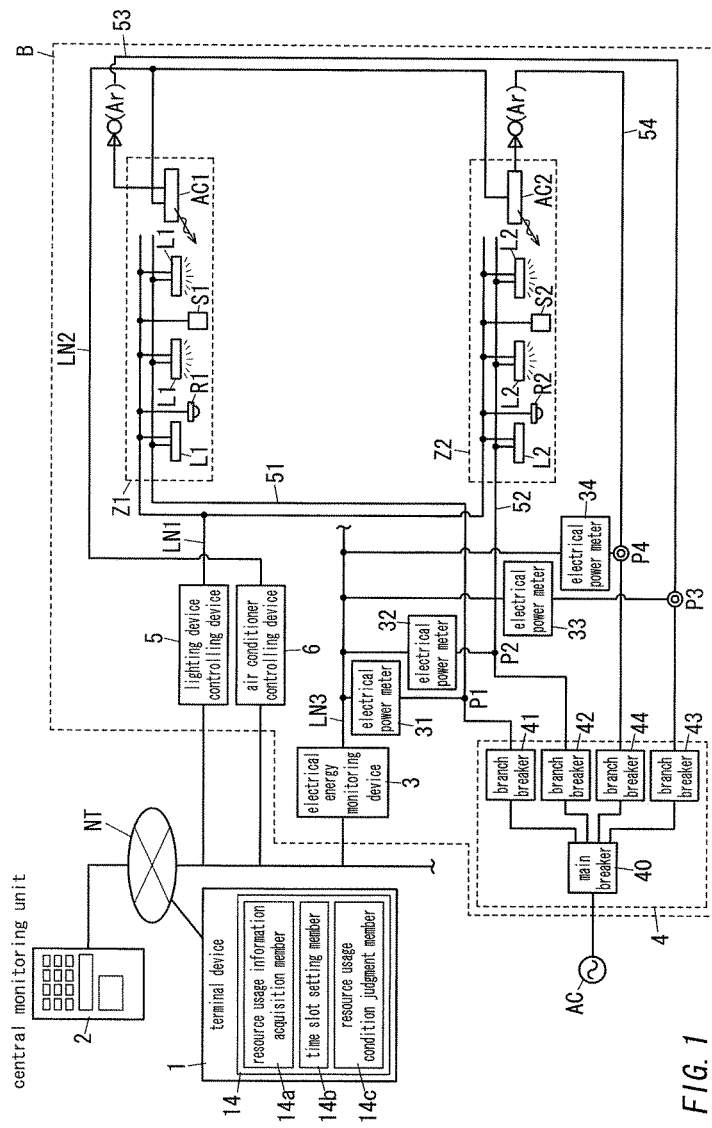
FIG. 1 shows a schematic configuration of the energy conservation analysis system in the first embodiment.

FIG. 1 shows a schematic configuration indicating the entire of the configuration of the energy conservation analysis system. This system is configured to manage an amount of the electrical consumption of the devices to be monitored in the premise B to diagnose the energy conservation. (The device is, for example, the lighting devices L1 and L2, and the air conditioners AC1 and AC2.)

The energy conservation analysis system comprises an electrical energy monitoring device 3, a lighting device controlling device 5, an air conditioner controlling device 6, a central control unit 2, and terminal devices 1 as main components. The electrical energy monitoring device 3 is configured to monitor an amount of the electrical consumption of the device to be monitored in the premise B to output an amount of the electrical consumption to the central monitoring unit 2. (The devices to be monitored are such as the lighting devices L1, L2, and the air conditioner AC1, AC2.) The lighting device controlling device 5 and the air conditioner controlling device 6 are configured to control the operation of the devices to be monitored. The central monitoring unit 2 is connected to the electrical energy monitoring device 3, the lighting device controlling device 5 and the air conditioner controlling device 6 through the communication network NT such as the internet. The terminal device 1 is connected to the central monitoring unit 2 through the communication network NT. The electrical energy monitoring device 3, the lighting device controlling device 5, and the air conditioner controlling device 6 are assigned with the global IP addresses, respectively. Consequently, it is possible to establish the communication through the communication network NT.

Firstly, the devices to be monitored in the premise B are explained. The premise B is divided into two zones of zone Z1 and zone Z2. The zone Z1 has a plurality of the lighting devices L1, the air conditioner AC1, the operation switch S1, and the human detector R1. The zone Z2 has a plurality of the lighting devices L2, the air conditioner AC2, the operation switch S2, and the human detector R2. The operation switch S1 is disposed in the zone Z1 and is configured to make the operation of such as starting/finishing the lighting device L1 in the zone Z1 located in the same zone of the lighting device L1. The operation switch S2 is disposed in the zone Z2 and is configured to make the operation of such as starting/finishing the lighting device L2 in the zone Z2 located in the same zone of the lighting device L2. The human detectors R1, R2 are configured to detect the existence or nonexistence of the human in the zone Z1 and zone Z2, respectively. (The human detectors R1 and R2 are, in other words, the human detection means.)

The premise B is provided with a distribution board 4 which incorporates the main breaker 40 and a branch breaker 41 to 44 therein. The main breaker 40 is connected to the commercial power Ac. The branch breaker 41 is connected to the branch circuit 51 which is connected to a plurality of the lighting device L1 disposed in the zone Z1. The branch breaker 42 is connected to the branch circuit 52 which is connected to a plurality of the lighting devices L2 disposed in the zone Z2. The branch breaker 43 is connected to the branch circuit 53 which is connected to the air conditioner AC1 which is disposed in the zone Z1. The branch breaker 44 is connected to the branch circuit 54 which is connected to the air conditioner AC4 which is disposed in the zone Z2. Each the branch circuit is provided with measurement points P1 to P4. The measurement points P1 to P4 are provided for measuring the load current by the electrical power meters corresponding to the measuring points P1 to P4, respectively. Consequently, the electrical power meters P1 to P4 measure amounts of the electrical consumption at predetermined measurement intervals, and then the electrical power meters store them in the embedded memory. The electrical power meters 31 to 34 are connected to the electrical energy monitoring device 3 through the signal line LN3. The electrical power meters 31 to 34 are configured to output the measurement result stored in the embedded memory to the electrical energy monitoring device 3 every predetermined measurement interval.

In addition, the lighting devices L1, L2, the operation switches S1, S2, and the human detector R1, R2 in each the zone Z1 and Z2 are connected to the lighting device controlling device 5 through the signal line LN1. The lighting devices L1, L2, the operation switches S1, S2, and the human detectors R1, R2 are provided with the individual address information, respectively. The lighting device controlling device 5 is configured to send the transmission signal including the address information to the transmission line LN1. Consequently, the lighting device controlling device 5 is configured to send and receive the transmission signal to and from the lighting devices L1, L2, the operation switches S1, S2, and the human detectors R1, R2 which are desired. The lighting device controlling device 5 has a memory (which is not shown in the illustration) which is configured to store the control schedule information sent from the terminal device 1 or the central monitoring unit 2. The control schedule information has the information such as "the time to start the operation of the lighting devices L1, L2 in the zone Z1, Z2 in every weekday" and "time to finish the operation of the lighting devices L1, L2 in the zone Z1, Z2 in every weekday". When getting to the starting time determined by the control schedule information, the lighting device controlling device 5 sends the start controlling signal to the lighting devices L1, L2, corresponding to the start controlling signal, thereby starting the operation of the lighting device. In addition, when getting to the finishing time determined by the control schedule information, the lighting device controlling device 5 sends the finish controlling signal to the lighting devices L1, L2 corresponding to the finish controlling signal, thereby finishing the lighting device. In addition, in order to start and finish the operation of the desired lighting devices L1, L2, when the employed worker operates the operation switches S1, S2 corresponding to the lighting devices L1, L2, the operation switches S1, S2 sends the operation signal to the lighting device controlling device 5. When the lighting device controlling device 5 receives the operation signal, the lighting device controlling device 5 sends the control signal to the corresponding lighting devices L1, L2 according to the operation signal which is sent from the operation switches S1, S2. In this manner, starting or finishing the operation of the corresponding lighting devices L1, L2 is made. Therefore, even if in the time other than the time slot determined by the control schedule information, the lighting devices L1, L2 are started or finished. In addition, when the human detectors R1, R2 in respective zone Z1, Z2 detect the human, the human detector R1, R2 sends the human detection signal to the lighting device controlling device 5. Consequently, the lighting device stores the history of the human detection signal.

In contrast, the air conditioners AC1, AC2 in the respective zones Z1, Z2 is connected to the air conditioner controlling device 6 through the transmission line LN2. The air conditioner AC1, AC2 are provided with individual address information, respectively. The air conditioner controlling device 6 is configured to send the transmission signal including the address information through the transmission line LN2. Consequently, the air conditioner controlling device 6 sends and receives the transmission signal to the desired air conditioners AC1, AC2. The air conditioner controlling device 6 has a memory (which is not shown in the illustration) which is configured to store the control schedule information which is sent from the terminal device 1 or the central monitoring unit 2. The control schedule information includes the information such as the operation start time and the operation finish time of the air conditioners AC1, AC2 in the respective zones Z1, Z2 in every weekday. When getting to the operation start time determined by the control schedule information, the air conditioner controlling device 6 sends the operation start signal to the air conditioner AC1, AC2 corresponding to the operation start signal, thereby allowing the air conditioner to operate. In addition, when getting at the control finish time determined by the control schedule information, the air conditioner controlling device 6 sends the operation finish signal to the air conditioner AC1, AC2 corresponding to the operation finish signal, thereby allowing the air conditioner to finish. The zones Z1, Z2 are provided with the operation switches (which are not illustrated) for starting or finishing the air conditioner AC1 and AC2 in the respective zones Z1 and Z2. When the employed worker operates the operation switch corresponding to the air conditioner AC1, AC2 in order to start or finish the desired air conditioner, the operation switch sends the operation signal to the air conditioner controlling device 6. When the air conditioner controlling device 6 receives the operation signal, the air conditioner controlling device 6 sends the control signal to the corresponding air conditioners AC1, AC2 in response to the operation signal sent from the operation switch. Consequently, the air conditioner AC1, AC2 is changed from the operation condition to the stop condition or from the stop condition to the operation condition. Therefore, it is possible to operate the air conditioner AC1, AC2 at a time other than the time slot determined by the controlling schedule information.

Figure 3:
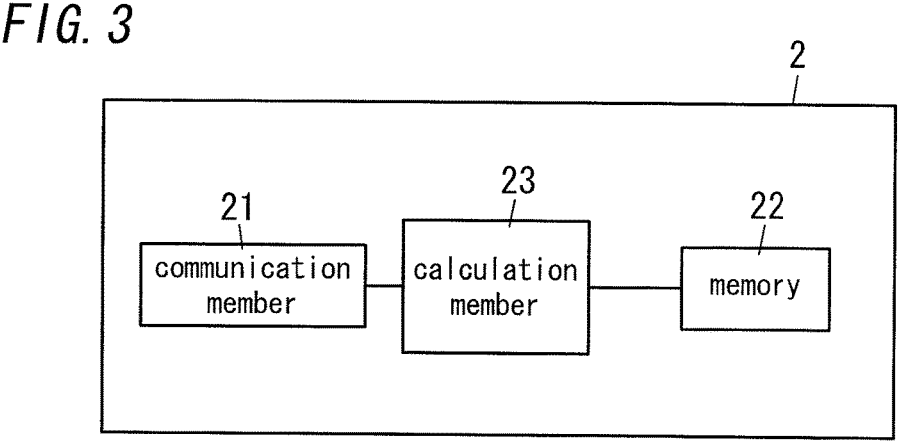
FIG. 3 shows a bloc diagram of the central monitoring unit of the above.

In addition, FIG. 3 shows a block diagram indicating the schematic components of the central monitoring unit 2. The central monitoring unit 2 comprises the communication member 21, the memory 22, and the calculation member 23 as the main components. The communication member 21 is configured to establish the communication through the network NT. The communication member 21 is configured to obtain "the measurement result indicating an amount of the electrical consumption in the branch circuits 51 to 54" obtained from the electrical energy monitoring device 3 by the communication member 21. The lighting device controlling device 5 is configured to obtain the measurement data of the human detectors R1, R2 obtained by the lighting device controlling device 5. The memory 22 stores the measurement result and the measurement data. The calculation member 23 of the central monitoring unit 2 is configured to send the data request signal from the communication member 21 to "electrical energy monitoring device 3" and "the lighting device controlling device 5" every predetermined data collection period. In response to the data request signal, the electrical energy monitoring device 3 returns "the measurement result indicating an amount of the electrical consumption in the respective branch circuits 51 to 54". In addition, in response to the data request signal, the lighting device controlling device 5 returns the detection signal of the human detectors R1, R2. When the communication member 21 receives the measurement result and the detection signal, the memory 22 stores "the measurement result of an amount of the electrical consumption" and "the detection signal of the human detectors R1, R2".

In addition, the terminal device 1 of this system holds the program for performing the process of evaluating whether "the management of an amount of the electrical consumption" and "the electrical consumption" are efficient or not. The terminal device 1 is configured to execute the program to realize "the management function of an amount of electrical consumption" and "the electrical power evaluating function".

Figure 2:
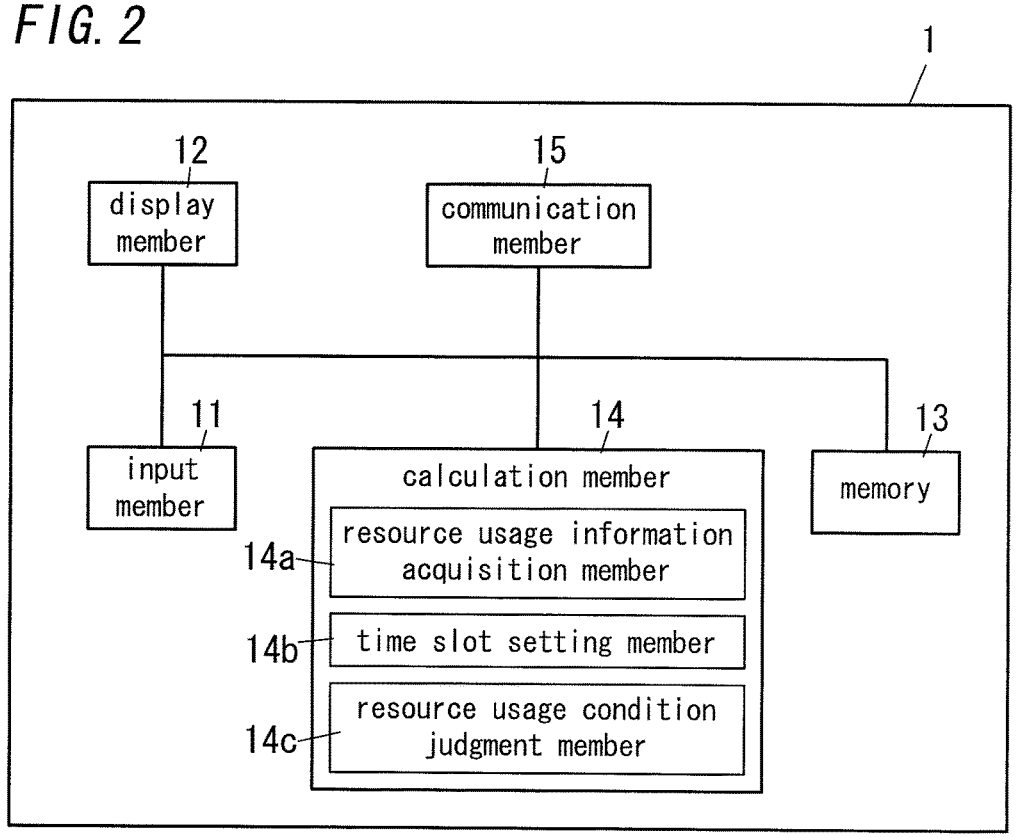
FIG. 2 shows a block diagram of the terminal device of the above.

The terminal device 1, shown in the block diagram of FIG. 2, comprises an input member 11, a display member 12 (in other words, display means), a memory 13, a calculation member 14, and a communication member 15. The input member 11 is realized by a keyboard, a mouse, and a touch panel. The display member 12 is controlled its display contents by the calculation member 14 explained later. The memory 13 is realized by the bulk storage such as the hard disk and the memory such as ROM and the RAM. The memory 13 is configured to store the information such as the measurement result of an amount of the electrical consumption. The calculation member 14 is configured to run the program in the memory 13. The communication member 15 is configured to establish the communication through the network NT.

The calculation member 14 runs the program stored in the memory 13, whereby the calculation member 14 acts as the resource usage information acquisition member 14a (in other words, the resource usage information acquisition means), the time slot setting member 14b (in other words, the time slot setting means), and the resource usage condition judgment member 14c (in other words, resource usage condition judgment means).

The control system of the above is configured to start and finish the operation the device to be monitored according to the predetermined control schedule. Therefore, for example, when the control schedule has the schedule of "the device to be monitored is started during an entire of the working time" and "the device to be monitored is finished during the time other than the working time", all the device to be monitored is operated according to the schedule, there is no device to be monitored which is operated during the period other than the working time. Therefore, there is no possibility to waste the electrical power. However, all the devices to be monitored are not always operated according to the predetermined schedule. When the employed worker needs to do some operations during the time other than the working time, the employed worker has to operate the operation switches S1, S2 to operate the devices to be monitored (such as lighting devices L1, L2 and the air conditioner AC1, AC2). Then, if the employed worker leaves the work while the employed worker forgets to finish the devices to be monitored, the device to be monitored is operated continuously. Therefore, there is a possibility that the electrical power wasted.

The energy conservation analysis system of this invention is used in the control system used in the above for the energy conservation analysis of evaluating whether the electrical power consumption of the device to be monitored in each time slot is efficient or not. In addition, the energy conservation analysis system of this invention is used to create the control schedule which is capable of reducing an amount of the electrical consumption. Hereinafter, the step of performing the energy conservation analysis for the electrical power manager of the premise B after grasping an amount of the electrical consumption of the device to be monitored by the terminal device is explained.

Firstly, in this system, if the terminal device 1 is connected to the central monitoring unit 2 which is one to be monitored through the communication network NT, the resource usage information acquisition member 14a of the calculation member 14 of the terminal device 1 automatically collect the data (in other words, the resource usage information) of amounts of the electrical consumption in the branch circuits 51 to 54 through the communication member 15 of the central monitoring unit 2. Then, the resource usage information acquisition member 14a stores the collected data of amounts of the electrical consumption in the memory 13. The data of the amounts of the electrical consumption is associated with the time. Therefore, the memory 13 stores an amount of the electrical consumption in association with the time.

The time slot setting member 14b of the calculation member 14 sets a beneficial use time slot T1, a waste use time slot T2, and an efficiency improvement time slot T3 within 24 hours, the beneficial use time slot T1 being defined as a time that the usage of the electrical power by the device to be monitored in the beneficial use time slot T1 is considered as the beneficial use, a waste use time slot T2 being defined as a time when the usage of the electrical power by the device to be monitored in the waste use time slot T2 is considered as the waste use, and a efficiency improvement time slot T3 that the usage of the electrical power by the device to be monitored in the efficiency improvement time slot T3 is considered as the electrical power to be reduced. The time slots are set to each the branch circuits 51 to 54. The time slots are set by the electrical power manager according to the operation of the input member 11. Hereinafter, regarding the branch circuit 51, the explanation is made under a condition where "8:00 to 20:00 is defined as the shop hour of the premise B is defined as the beneficial use time slot T1", "0:00 to 7:00 and 22:00 to 24:00 are defined as the closing hour of the premise B", and "7:00 to 8:00 and 20:00 to 22:00 are defined as the preparation of the opening and the closing of the premise B".

In addition, the resource usage condition judgment member 14c calculates an amount of the electrical consumption in each time slot T1, T2, T3 on the basis of the data of an amount of the electrical consumption obtained by the resource usage information acquisition member 14a. The display member 12 displays an amount of the electrical consumption in each the time slots T1, T2, T3.

Figure 4:
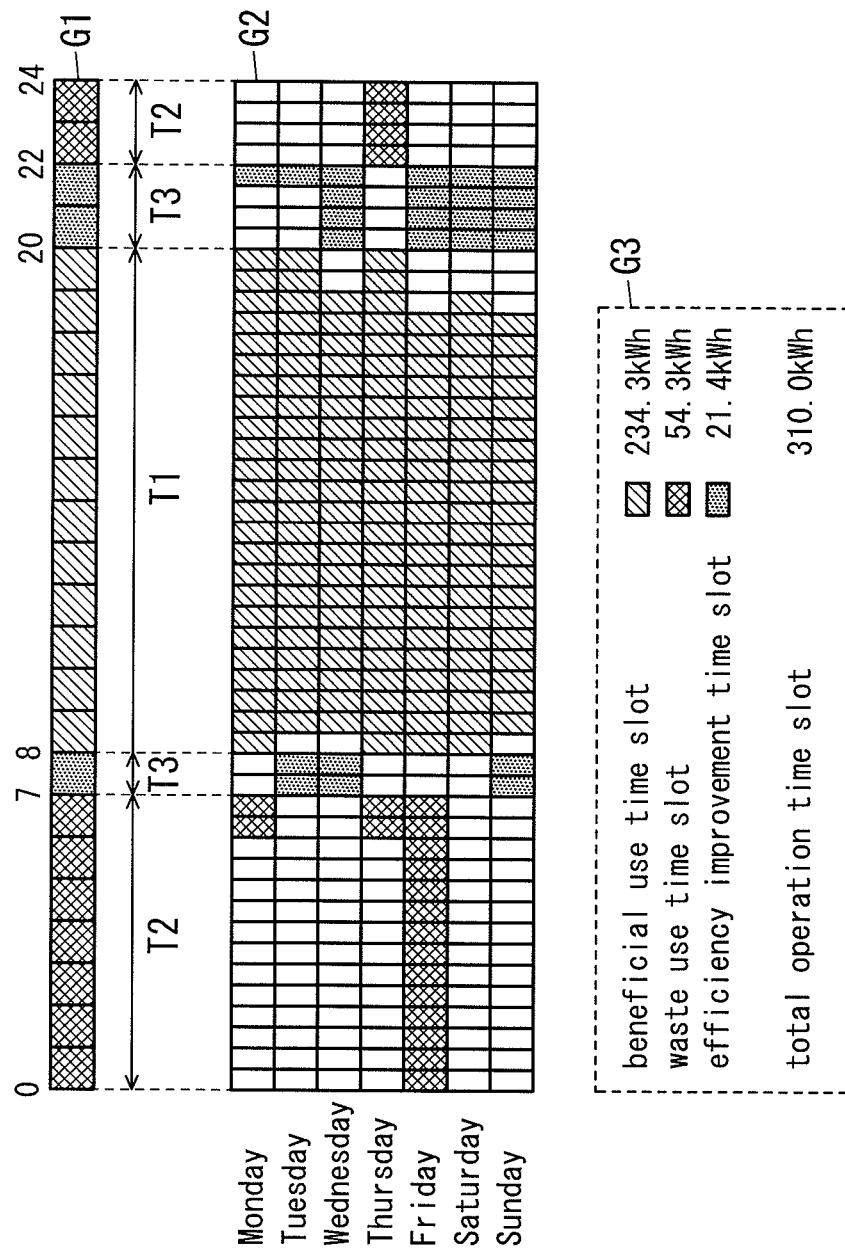
FIG. 4 shows a schematic configuration of the chart which is displayed of the above.

FIG. 4 is an image which is displayed on the display. The resource usage condition judgment member 14c creates the time range of the time slot display member G1 which indicates the beneficial use time slot T1, the waste use time slot T2, and the efficiency improvement time slot T3 which are set to the branch circuit 51. The time slot display member G1 displays 24 hours which is divided into a plurality of cells by the time unit of one hour and displays the cells with color coding in order to indicate what cell is belonging to any time slot. FIG. 4 is shown by the black and white presentation. Therefore, the cells belonging to the beneficial use time slot T1 is indicated by the diagonal line extends to the right upper direction. The cells belonging to the waste use time slot T2 is indicated by the halftone screen. The cells belonging to the efficiency improvement time slot T3 is indicated by the dot.

Furthermore, the resource usage condition judgment member 14c creates "the week display member G2 which indicates the condition of the electrical consumption of the branch circuit 51 in one week from Monday to Sunday" below the time slot display member G1. When the resource usage condition judgment member 14c creates the week display member G2, the resource usage condition judgment member 14c compares the data of an amount of the electrical consumption of the branch circuit 51 in every hour with a predetermined threshold value (corresponding to the standby electricity). In addition, the resource usage condition judgment member 14c creates the week display member G2 to display the cells corresponding to the period exceeds the threshold value (that is, the period when "the device to be monitored" connected to the branch circuit 51 is operated) with the coloring. The resource usage condition judgment member 14c creates the week display member G2 so as not to display the cell corresponding to the period below the threshold value (that is, the period when "the device to be monitored" connected to the branch circuit 51 is stopped). The cell corresponding to the period exceeding the threshold (that is, the period when "the device to be monitored" connected to the branch circuit 51) is displayed with the coloring similar to the time slot display member G1 so as to indicate what time slot the cell belongs to. The cell of the week display cell is divided by 30 minutes in 24 hours.

In addition, the resource usage condition judgment member 14c creates the electrical consumption condition display member G3 below the week display member G2. The electrical consumption condition display member G3 displays amounts of the electrical consumption of the beneficial use time slot T1, the waste use time slot T2, the efficiency improvement time slot T3, respectively, and displays the total amount of the electrical consumption in one week (corresponding to total operating time slot) by the actual value (kilowatt-hour).

When the electrical power manager operates the input member 11, the electrical power manager can see the contents, created as above, of the display member 12. In addition, the result of an amount of the electrical consumption is shown in parallel with each time slots of the beneficial use time slot T1, the waste use time slot T2, and the efficiency improvement time slot T3, the electrical power manager can aware whether the electrical power is efficiently used or not and whether the electrical power is wasted or not. That is, the electrical power manager can judge the electrical power consumption in the beneficial use time slot T1 is efficiently used and the electrical power consumption in the waste use time slot T2 is waste.

In addition, this embodiment further includes the efficiency improvement time slot T3 which is regarded as the period when the electrical consumption in the device to be monitored is reduced. The efficiency improvement time slot T3 is regarded as the period when the electrical power may use or not. However, the efficiency improvement time slot T3 is a time slot when an amount of the electrical consumption is to be reduced. The electrical power manager can judge the electrical consumption in the efficiency improvement time slot T3 as the electrical consumption according to the need. Setting the time slot for a purpose of improving the operational efficiency makes it possible for the electrical power manager without sufficient knowledge to judge the energy conservation with recognizing the time slot for improvement of the operational efficiency. Therefore, it is possible to improve the control schedule with the electrical power manager's instinct. Therefore, it is possible to perform the energy conservation.

In addition, setting each the time slot of the beneficial use time slot T1, the waste use time slot T2, and the efficiency improvement time slot T3 makes it possible for the electrical power manager to exactly grasp the usage condition of the electrical power. Therefore, it is possible to prevent too much estimation and too less estimation of the waste electrical consumption. Therefore, it is possible to look into the point to be improved of the control schedule adequately.

That is, the electrical power manager without sufficient knowledge can judge whether the electrical power is wasted or not by the device to be monitored, adequately.

After the electrical power manager operates the input member 11 to obtain the control schedule from the lighting device controlling device 5 and the air conditioner controlling device 6 and improve them for the purpose of the energy conservation, the electrical power manager sends the changed control schedule information from the communication member 15 to the lighting device controlling device 5 and the air conditioner controlling device 6. Consequently, the lighting device controlling device 5 and the air conditioner controlling device 6 are updated their control schedule information stored in them.

In addition, the time slot setting member 14b may obtain the control schedule information (in other words, the control schedule corresponding to each the branch circuit 51 to 54.) from the lighting device controlling device 5 and the air conditioner controlling device 6. In this case, then, the time slot setting member 14b applies the predetermined time slot setting rule to the obtained control schedule information to automatically set each the time slot of the beneficial use time slot T1, the waste use time slot T2, and the efficiency improvement time slot T3. The time slot automatic setting is hereinafter explained.

The control schedule obtained from the lighting device controlling device 5 includes the time for starting and finishing the lighting devices L (L1, L2). The control schedule information obtained from the air conditioner controlling device 6 includes the operation start time and the operation finish time of the air conditioner AC (AC1, AC2). Hereinafter, in the control schedule information, the meaning of starting the operation of the device to be monitored is a meaning of starting the operation of the lighting device L or starting the operation of the air conditioner AC. The meaning of finishing the operation of the device to be monitored is a meaning of finishing the operation of the lighting device L or finishing the operation of the air conditioner AC.

The time slot setting rule applied to the time automatic setting performance by the time slot setting member 14 is predetermined as explained below. Firstly, setting the period from the time of starting the operation of the device to be monitored to the time of finishing the operation of the device to be monitored as the beneficial use time slot T1 is performed. Then, setting the time range to the start time of the beneficial use time slot T1 from a predetermined time before the start time (for example, one hour) and setting the time range from the finish time of the beneficial use time slot T1 to a predetermined time after the finish time of the beneficial use time slot T1 (for example, two hours) as the efficiency improvement time slot T3 are performed. Then, setting the time waste use time slot T2 which is other than the efficiency improvement time slot T3 and the beneficial use time slot T1 are performed.

For example, as shown in FIG. 5, in a case where the control schedule information includes the time for starting the operation of the device to be monitored to 8:00 and the time for finishing the operation of the device to be monitored to 20:00, the time slot setting member 14b sets the period of 8:00 to 20:00 as the beneficial use time slot T1, sets the period of 7:00 to 8:00 and the period of 20:00 to 22:00 as the efficiency improvement time slot T3, and sets 0:00 to 7:00 and 22:00 to 24:00 as the waste use time slot T2.

Therefore, on the basis of the control schedule information, each the time slot of the beneficial use time slot T1, the waste use time slot T2, and the efficiency improvement time slot T3 is automatically set without beleaguering the electrical power manager.

As explained above, the time slot setting means is configured to obtain the control schedule of the device to be monitored and apply the predetermined time slot setting rule to the obtained control schedule information to set the each time slot.

In addition, the control schedule has the start planning time for starting the operation of the device to be monitored and the finish planning time for finishing the operation of the device to be monitored. The time slot setting rule has a rule of setting the period from the start planning time to the finish planning time as the beneficial use time slot. The time slot setting rule has a rule of setting the period from the finish planning time to the start planning time as the waste use time slot. The time slot setting rule has a rule of setting the time slot other than the beneficial use time slot and the waste use time slot as the efficiency improvement time slot.

It is noted that, in the above explanation, the start planning time is set to 8:00. The finish planning time is set to 20:00. The beneficial use time slot is set as a period from 8:00 to 20:00. The waste use time slot is set as the period from 22:00 to 24:00 and the period from 0:00 to 7:00. That is, the waste use time slot is set as the period from the finish planning time to the start planning time. Then, the efficiency improvement time slot is set as a period from 7:00 to 8:00 and the period from 20:00 to 22:00. That is, the efficiency improvement time slot is set as the period other than the beneficial use time slot and the waste use time slot. However, the time setting is not limited to the above.

The control schedule has the start planning time for starting the operation of the device to be monitored and the finish planning time for finishing the operation of the device to be monitored. The time slot setting rule has a rule of setting the period from the start planning time to the finish planning time as the beneficial use time slot. The time slot setting rule has a rule of setting a period to the start planning time from a first time before a certain period of the start planning time as the first efficiency improvement period. The time slot setting rule has a rule of setting the period from the finish planning time to the second time after a certain period of the finish planning time as the second efficiency improvement period. The time slot setting rule has a rule of setting the first efficiency improvement period and the second efficiency improvement period as the efficiency improvement time slot. The time slot setting rule has a rule of setting the period other than the beneficial use time slot and the efficiency improvement time slot as the waste use time slot. Consequently, the time slot setting means is configured to set the beneficial use time slot, the waste use time slot, and the efficiency improvement time slot.

Consequently, it is possible to automatically set each the time slot of the beneficial use time slot T1, the waste use time slot T2, and the efficiency improvement time slot T3 with low additional work of the electrical power manager.

It is noted that, in the above explanation, the first efficiency improvement period is defined as the period from 7:00 to 8:00. In addition, the second efficiency improvement period is defined as the period from 20:00 to 22:00. However, the first efficiency improvement period and the second efficiency improvement period are not limited thereto.

In addition, the first time may be set to the time equal to the start planning time. Therefore, the first efficiency improvement period may be defined as a period having a range of 0 or more. In addition, the second time may be set to the time equal to the finish planning time. Therefore, the second efficiency improvement period may be defined as a period having a range of 0 or more.

From another viewpoint, the control schedule has a start planning time for starting the operation of the device to be monitored and the finish planning time for finishing the operation of the device to be monitored. The time slot setting rule has a rule of setting the period from the start planning time to the finish planning time as the beneficial use time slot. The time slot setting rule has at least one of the first rule and the second rule. The first rule is defined by a rule of setting the period from the time before a certain period before the start planning time to the start planning time. The second rule is a rule of setting the period from the finish planning time to the second time after a certain period from the finish planning time as the second efficiency improvement period. The time slot setting rule has a rule of setting the first efficiency improvement period and the second efficiency improvement period as the efficiency improvement time slot. The time slot setting rule has a rule of setting the period other than the beneficial use time slot and the efficiency improvement time slot as the waste use time slot. Consequently, the time slot setting means is configured to set the beneficial use time slot, the waste use time slot, and the efficiency improvement time slot.

In addition, the time slot setting rule has a rule of setting the start planning time to the finish planning time next to the start planning time as the beneficial use time slot.

Consequently, it is possible to surely set the beneficial use time slot.

In addition, the time slot setting rule has a rule of setting the period from the first time before a certain period from the start planning time to the start planning time next to the first time as the first efficiency improvement period.

Consequently, it is possible to surely set the first efficiency improvement period. That is, it is possible to surely set the efficiency improvement time slot.

In addition, the time slot setting rule has a rule of setting the finish planning time to the second time, next to the finish planning period, after a certain period of the finish planning period as the second efficiency improvement period.

Consequently, it is possible to surely set the second efficiency improvement period. That is, it is possible to surely set the efficiency improvement time slot.

It is noted that, in the above explanation, the first time is set to 7:00. The second time is set to 22:00. However, the first time and the second time are not limited to the time explained in the above.

In addition, the time slot setting member 14b uses "the control schedule information obtained from the lighting device controlling device 5 and the air conditioner controlling device 6" in combination with "the data of an amount of the electrical consumption in the branch circuits 51 to 54 which is collected by the resource usage information acquisition member 14a and which is stored in the memory 13" to automatically set each the time slot of the beneficial use time slot T1, the waste use time slot T2, and the efficiency improvement time slot T3. The time slot automatically setting is explained below.

The time slot setting member 14b is configured to apply the time slot setting rule applied to the time slot automatically setting process, time slot setting rule being predetermined as follows. Firstly, the time slot setting member 14b sets the period from the time for starting the operation of the device to be monitored to the time for finishing the operation of the device is set as the beneficial use time slot T1.

Then, on the basis of the data of an actual amount of the electrical consumption stored in the memory 13, the time slot setting member 14b calculates the time difference (hereinafter referred to as the start time difference) between "the time when the device to be monitored is started before the start time of the beneficial use time slot T1" and "the start time of the beneficial use time slot T1" in each day of the past predetermined days (for example, one week). In addition, the time slot setting member 14b calculates the time difference (hereinafter referred to as the finish time difference) between the time when the device is finished before the finish time of the beneficial use time slot T1 and the finish time of the beneficial use time slot T1 in each day of the past predetermined days (for example, one week). Then, the time slot setting member 14b calculates the central value of the start times from the start times calculated on a daily basis of the above and calculates the central value of the finish times from the finish times calculated on a daily basis of the above. Subsequently, the time slot setting member 14b sets the time slot from the start time of the beneficial use time slot T1 before the central point of the start time difference and sets the time slot from the finish time of the beneficial use time slot T1 before the central value of the finish time difference as the efficiency improvement time slot T3.

Furthermore, the period other than the beneficial use time slot T1 and the efficiency improvement time slot T3 set in the above is set as the waste use time slot T2.

For example, as shown in FIG. 6, if the control schedule information of the branch circuit 51 is set to have start time for starting the operation of the device to be monitored as 8:00 and the finish time for finishing the operation of the device to be monitored as 20:00, the period from 8:00 to 20:00 is set as the beneficial use time slot T1.

Then, the time slot setting member 14b read out the data of "an amount of the electrical consumption of the past predetermined period which is consumed in the branch circuit 51" from the memory. Subsequently, the time slot setting member 14 compares "the data of an amount of the electrical consumption which is read out" with "the threshold value". (The threshold value corresponds to the standby electrical consumption.) When the data of an amount of the electrical consumption which is read out exceeds the threshold, the start of the operation of the device to be monitored connected to the branch circuit 51 is recognized. In contrast, when the data of an amount of the electrical consumption which is read out is below the threshold, the finish of the operation of the device to be monitored connected to the branch circuit 51 is recognized. Then, as shown in FIG. 7 A, the time of starting "the device to be monitored" connected to the branch circuit 51 and the time of finishing "the device to be monitored" connected to the branch circuit 51 are stored as the on-off information on a daily basis.

Then, on the basis of the on-off information, the time slot setting member 14b calculates the start time difference and the finish time difference on a daily basis. Then, as shown in FIG. 7 B, the time slot setting member 14b creates the time difference information including the start time difference and the finish time difference on a daily basis and store it. Then, on the basis of the time difference information, the central value of the start time difference and the finish time difference in the past predetermined period (for example, one week before) is calculated. In this case, the central value of the start time difference is assumed to be "one hour" and the central value of the finish time difference is assumed to be "one hour". Then, "the time slot of one hour from the 7:00 to 8:00 of the start time of the beneficial use time slot T1" and "the time slot of one hour from 20:00 of the finish time of the beneficial use time slot T1 to the 21:00" are set as the efficiency improvement time slot T3. (Refer to FIG. 6.) Furthermore, the period other than the beneficial use time slot T1 and the efficiency improvement time slot T3 is set as the waste use time slot T2. (Refer to FIG. 6.)

Then, the time slot setting member 14b repeats the setting process of each the time slot of the above in each day. Consequently, it is possible to set each the time slot on the basis of the control schedule information of the device to be monitored and the actual use condition of the device to be monitored.

Therefore, on the basis of the control schedule information of the device to be monitored and the actual use condition, each time slot of "the beneficial use time slot T1", "the waste use time slot T2", and "the efficiency improvement time slot T3" are automatically set without any work of the electrical power manager. Therefore, regardless of the professional skill of the electrical power manager, each the time slot is optimally set. Therefore, it is possible for the electrical power manager to make a judgment of whether the usage electrical power is beneficial or not.

Summarizing the above, the control schedule has the start planning time for starting the operation of the device to be monitored and the finish planning time for finishing the device to be monitored. The time slot setting means is configured to take into consideration of the past start time to determine the standard start time. The past start time indicates the time when the device to be monitored is started in past. The time slot setting means is configured to take into consideration of the past finish time to determine the standard finish time. The past finish time indicates the time when the device to be monitored is finished in past. The time slot setting rule has a rule of setting the period from the standard start time to the start planning time as the first efficiency improvement period. The time slot setting rule has a rule of setting the period from the finish planning time to the standard finish time as the second efficiency improvement period. The time slot setting rule has a rule of setting the first efficiency improvement period and the second efficiency improvement period as the efficiency improvement time slot. The time slot setting rule has a rule of setting the period other than the beneficial use time slot and the efficiency improvement time slot as the waste use time slot. Consequently, on the basis of the control schedule information, the beneficial use time slot, the waste use time slot, and the efficiency improvement time slot are set.

The time slot setting means is configured to take into consideration of the resource usage information to recognize the past start time. The time slot setting means is configured to take into consideration of the resource usage information to recognize the past finish time.

Consequently, without monitoring the device to be monitored, individually, each the time slot of the beneficial use time slot T1, the waste use time slot T2, and the efficiency improvement time slot T3 is automatically set without additional work of the electrical power manager.

In addition, the time slot setting means is configured to recognize the past start time when an amount of the resource usage exceeds the threshold. The time slot setting means is configured to recognize the past finish time when an amount of the resource usage falls below the threshold.

According to this configuration, each the time slot of the beneficial use time slot T1, the waste use time slot T2, and the efficiency improvement time slot T3 is automatically set without additional work of the electrical power manager.

In addition, the time slot setting means is configured to determine the standard start time on the basis of a plurality of the past start times.

Consequently, the standard start time is determined with consideration of the past usage condition of the device to be monitored. That is to say, when the device to be monitored is varied its usage condition, the standard start time is determined with consideration of the varied usage condition.

The time slot setting means is configured to determine the standard finish time on the basis of a plurality of the past finish times.

Consequently, the standard finish time is determined on the basis of the past usage condition of the device to be monitored. That is, when the device to be monitored is varied its usage condition, the standard finish time is determined on the basis of the varied usage condition.

In addition, the standard start time is set to the time between the earliest start time of the past and the latest start time of the past.

According to this, the standard start time is set with consideration of the past usage condition of the device to be monitored.

In addition, the standard finish time is set to the time between the earliest finish time of the past and the latest finish time of the past.

Consequently, it is possible to determine the standard finish time on the basis of the usage condition of the past usage condition of the device to be monitored.

Second Embodiment

Figure 8:
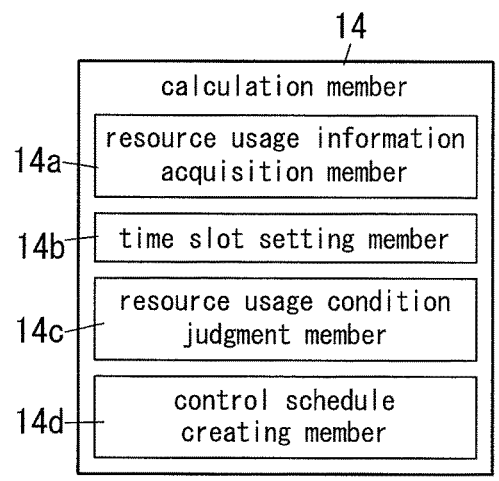
FIG. 8 shows a block diagram of the calculation member of the second embodiment.

This embodiment discloses, as shown in FIG. 8, the terminal device 1 which has a calculation member 14 with the control schedule creating member 14d (in other word, the control schedule creating means). Consequently, after setting each the time slot of the beneficial use time slot T1, the waste use time slot T2, and the efficiency improvement time slot T3 (T31, T32), the schedule setting rule is applied to each the time slot, whereby the control schedule is created and improved. It is noted that the components of this embodiment in common with the components of the first embodiment are symbolized by the same reference signs and are omitted their explanations.

Figure 9A:
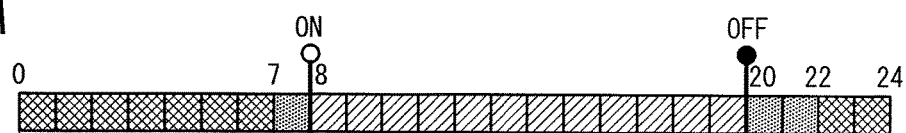
FIG. 9 A to FIG. 9 C shows illustrations each indicating the creating processing of the control schedule of the above.
Figure 9B:
Figure 9C:
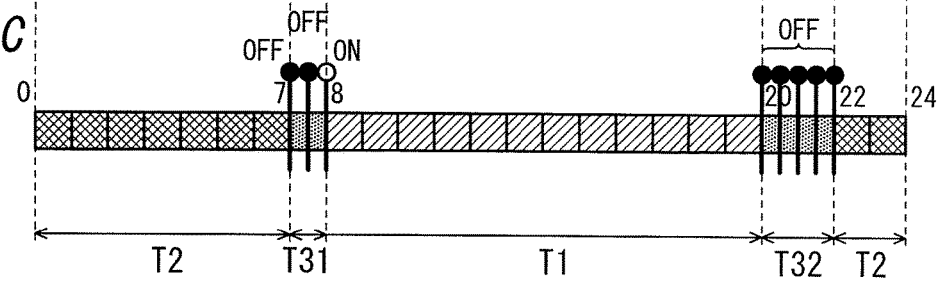

Firstly, as shown in FIG. 9, the beneficial use time slot T1 assumed to be set as the period from 8:00 to 20:00. The waste use time slot T2 assumed to be set as the period from 0:00 to 7:00 and from 22:00 to 24:00. The efficiency improvement time slot T31 is assumed to be set as the period of 7:00 to 8:00. The efficiency improvement time slot T32 is assumed to be set as the period of 20:00 to 22:00. The control schedule information includes the time for starting the operation of the device to be monitored as 8:00 and the time for finishing the operation of the device to be monitored as 20:00. Under this assumption, the control schedule creating member 14d is operated as follows.

The control schedule creating member 14d obtains the control schedule from the lighting device controlling device 5 or the air conditioner controlling device 6. The obtained current schedule is, as shown in FIG. 9 A, set to have a control content of starting the operation of the device to be monitored at the 8:00 of the finish time of the efficiency improvement time slot T31. In addition, the obtained current schedule is set to have a control content of finishing the operation of the device to be monitored at 20:00.

Then, the control schedule creating member 14d has the schedule setting rule for applying the schedule automatic setting process which is predetermined as follows. Firstly, the control content has no setting of start time of 7:00 of the efficiency improvement time slot T31 and has no setting of the finish time of 22:00 of the efficiency improvement time slot T32. Under this condition, the control schedule creating member 14d sets, as shown in FIG. 9 B, the control content which includes the efficiency improvement time slot T31 with the start time for starting the operation of the device to be monitored as 7:00 and with the finish time for finishing the operation of the device to be monitored as 22:00. The reason to create the control contents is to create the control schedule for improving the energy conservation. Therefore, the efficiency improvement time slot T31 is set to include the control content of finishing the operation of the device to be monitored at 7:00. In addition, the efficiency improvement time slot T32 is set to include the control contents of finishing the operation of the device to be monitored at 22:00.

As explained above, when the device to be monitored operates in line with the control schedule including the first control contents, the control schedule creating rule is configured reset the control schedule of the device to be monitored to the second control content instead of the first control content. The first instruction content is an instruction content including no control content of starting or finishing the operation of the device to be monitored in at least one of the start time or finish time. The second instruction content is an instruction content of finishing the operation of the device to be monitored in at least one of the start time and the finish time.

In addition, the time slot setting rule is a rule of setting a period between after the waste use time period and before the beneficial use time slot as the first efficiency improvement period. The time slot setting means is configured to recognize the first efficiency improvement period as the efficiency improvement time slot.

In addition, the control schedule setting rule is a rule of setting the control contents of finishing the operation of the device to be monitored as the control schedule information when the device to be monitored operates in line with the control schedule information having no control content of finishing the operation of the device to be monitored in the first efficiency improvement period.

Consequently, the device to be monitored is finished in the first efficiency improvement period. As a result, it is possible to reduce the energy consumption.

Specifically, the control schedule setting rule is a rule of setting the control content of finishing the operation of the device to be monitored in the start time as the control schedule information when the device to be monitored operates in line with the control schedule information having no control content of finishing the operation of the device to be monitored at the start time of the first efficiency improvement period.

Consequently, the device to be monitored is finished in the start time of the first efficiency improvement period. As a result, it is possible to reduce the energy consumption.

In addition, in the above explanation, the first efficiency improvement period defined by the efficiency improvement time slot T31 from 7:00 to 8:00. The second efficiency improvement period is defined as the efficiency improvement time slot T32 from 20:00 to 22:00. However, the first efficiency improvement period and the second efficiency improvement period are not limited thereto.

In addition, the time slot setting rule is a rule of setting the period from after the beneficial use time period to before the waste use time period as the second efficiency improvement period. The time slot setting means recognizes the second efficiency improvement period as the efficiency improvement time slot.

In addition, the control schedule setting rule is a rule of setting the control schedule of finishing the operation of the device to be monitored to the control schedule information when the device to be monitored operates in line with the control schedule information having no control contents of finishing the operation of the device to be monitored at the second efficiency improvement period.

Consequently, the device to be monitored is finished in the second efficiency improvement period. As a result, saving the energy consumption is achieved.

In addition, the control schedule setting rule is a rule of setting the control content of finishing the operation of the device to be monitored at the finish time as the control schedule information when the device to be monitored operates in line with the control schedule information having no control content of finishing the operation of the device to be monitored at the finish time of the second efficiency improvement period.

Consequently, the device to be monitored is finished at the finish time of the second efficiency improvement period. As a result, it is possible to save the energy consumption.

In addition, the control schedule creating member 14d may, as shown in FIG. 9 C, repeat the setting of the control contents a plurality of times within the efficiency improvement time slot T31 and the efficiency improvement time slot T32. In this case, the control schedule is improved to further energy conservation.

That is, the control schedule setting rule is a rule of setting a plurality of the control contents of finishing the operation of the device to be monitored as the control schedule information within the first efficiency improvement period when the device to be monitored operates in line with the control schedule information having no control contents of finishing the operation of the device to be monitored within the first efficiency improvement period.

Consequently, the device to be monitored is finished within the first efficiency improvement period. Therefore, saving the energy consumption is achieved.

Furthermore, the control schedule setting rule is a rule of setting the control contents of finishing the operation of the device to be monitored to the control schedule information when the device to be monitored operates in line with the control schedule information having no control content of finishing the operation of the device to be monitored in the second efficiency improvement period.

Consequently, the device to be monitored is finished within the second efficiency improvement period. Therefore, it is possible to reduce the consumption of the energy.

The display member 12 is configured to display the control schedule indicated in FIG. 9 B or FIG. 9 C created in the control schedule creating member 14d. When the electrical power manager operates the input member 11, the electrical power manager is able to confirm the control schedule created in the above. In addition, as needs, the electrical power manager sends the improved control schedule from the communication member 15 to the lighting device controlling device 5 and the air conditioner controlling device 6 to update the control schedule information stored in the lighting device controlling device 5 and the air conditioner controlling device 6.

Then, the operation of automatically adjusting the time of finishing the operation of the device to be monitored within the efficiency improvement time slot T3 (T31, T32) on the basis of the usage condition of the device to be monitored is explained. In addition, the schedule setting rule which is used in the schedule automatic adjust process of the control schedule creating member 14d is predetermined as follows.

Figure 10A:
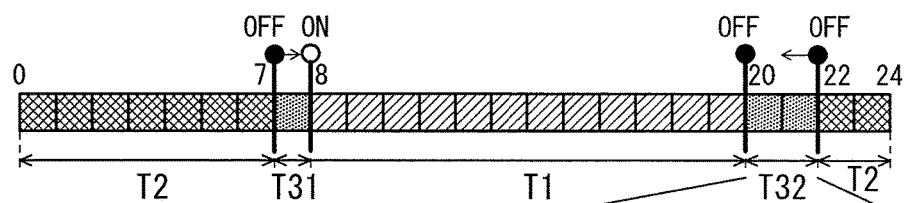
FIG. 10 A to FIG. 10 C shows illustration each indicating the automatic adjustment processing of the control schedule of the above.
Figure 10B:
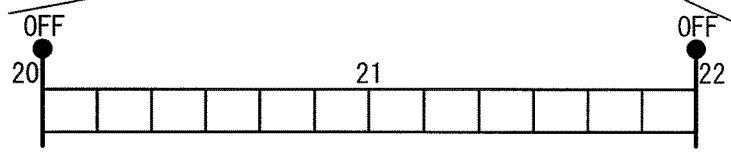
Figure 10C:
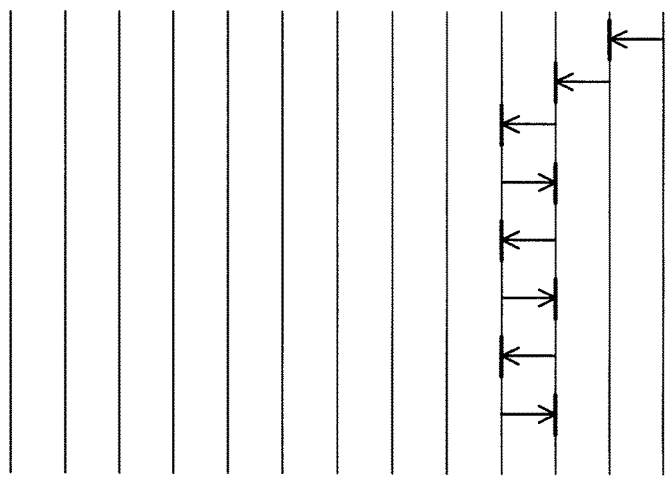

Firstly, as shown in FIG. 10 A, the beneficial use time slot T1 is set as the period from 8:00 to 20:00. The waste use time slot T2 is set as the period from 0:00 to 7:00 and 22:00 to 24:00. The efficiency improvement time slot T31 is set as the period from 7:00 to 8:00. The efficiency improvement time slot T32 is set as 20:00 to 22:00. The control schedule creating member 14d obtains the control schedule from the lighting device controlling device 5 and the air conditioner controlling device 6. The current obtained control schedule includes, as shown in FIG. 10 A, the time for starting the operation of the device to be monitored as 8:00 (which corresponds to on control time) and the time for finishing the operation of the device to be monitored as 7:00, 20:00, and 22:00 (which correspond to off control time).

Under this condition, the control schedule creating member 14d sets the off control time which is set by the finish time of the efficiency improvement time slot T32 ahead from 22:00, whereby the period of the efficiency improvement time slot T32 is shortened. In this manner, the waste use time slot T2 is extended such that the control schedule is capable of improving the energy conservation.

Firstly, FIG. 10 B shows the enlarged view of the control schedule in the period of 20:00 to 22:00 of the efficiency improvement time slot T32. In the first condition, the schedule is set to have 20:00 as off control time and 22:00 as the on control time. The control schedule creating member 14d is, as shown in FIG. 10 C, configured to set the off control time 10 minutes ahead from 22:00. In addition, after setting ahead the off control time as 21:50 in the first day, judging whether or not the operation of the device to be monitored by operating the operation switches S1, S2 by the employed worker in 10 minutes from 21:50 to 22:00 is performed. (10 minutes from 21:50 to 22:00 corresponds to the extension period of the waste use time slot T2.) If the employed worker does no on operation, judging whether or not the operation of the device to be monitored by operating the operation switches S1, S2 by the employed worker in 20 minutes from 21:40 to 22:00 is performed in the second day. (20 minutes from 21:40 to 22:00 corresponds to the extension period of the waste use time slot T2.) If the employed worker does no on operation, control schedule creating member 14d sets the off control time 10 minutes ahead in the third day. In addition, judging whether or not on operation is performed within 30 minutes from 21:30 to 22:00 by the employed worker. (30 minutes from 21:30 to 22:00 corresponds to the extended time of the waste use time slot T2.)

If the employed worker do on operation in the third day, the off control time is set 10 minutes back, whereby the off control time is set as 21:40. Then, judging whether or not on operation by the employed worker is performed within 20 minutes from 21:40 to 22:00. (20 minutes from 21:40 to 22:00 is set as the extension period.) If the employed worker does no on operation, the off control time is set ahead to 21:30 in fifth day. Then, judging whether or not on operation is performed by the employed worker within 30 minutes from 21:30 to 22:00 is performed. (30 minutes from 21:30 to 22:00 corresponds to the waste use time slot T2.)

As explained above, if no on operation by the employed worker is performed within the extension period of the waste use time slot T2, the off control time is set 10 minutes ahead. In contrast, when on operation by the employed worker is performed within the extension period of the waste use time slot T2, the off control time is set 10 minutes back. In addition, such the process is repeated. When the process of setting 10 minutes ahead and setting 10 minutes back are each performed three times, the off control time after each three times of setting ahead and setting back is fixed. (The fixed time corresponds to the time of setting 10 minutes back.) (In FIG. 10 C, the off control time at eighth day is 21:40.)

Therefore, the control schedule is improved in view of the usage condition of the device to be monitored. Therefore further improvement of the saving energy is achieved. Furthermore, this embodiment has an advantageous in view of a limit due to the upper limit of the registrable number of the control schedule and the actual comfort.

When the electrical power manager operates the input member 11, the electrical power manager is able to display the control schedule with the automatically adjusted off control time to the display and is able to confirm it. In addition, as needs, the electrical power manager sends the improved control schedule from the communication member 15 to the lighting device controlling device 5 and the air conditioner controlling device 6. Consequently, the control schedule information stored in the lighting device controlling device 5 and the air conditioner controlling device 6 is updated.

In addition, in the efficiency improvement time slot T31, the off control time of the efficiency improvement time slot T31 is set back to 7:00 to shorten the efficiency improvement time slot T31. Consequently, the waste use time slot T2 is extended. Therefore, the control schedule is improved in view of the energy conservation.

As explained above, the time slot setting means is configured to set the efficiency improvement time slot between the beneficial use time slot and the waste use time slot. The efficiency improvement time slot has a start time of the efficiency improvement time slot and the finish time of the efficiency improvement time slot. In addition, under the first condition where the device to be monitored operates in line with the control schedule which includes the control content of finishing the operation of the device to be monitored, the control schedule creating means carries out the following operation. Firstly, the control schedule creating means varies the time of finishing the operation of the device to be monitored within the efficiency improvement time slot from one of the time to create the control schedule information including "the waste use time slot with the extension period". Then, when both the first condition and the second condition are satisfied, the control schedule creating means varies the time of finishing the operation of the device to be monitored within the efficiency improvement time slot to create the waste use time slot with further extension period. The first condition is a condition where the device to be monitored is operated in line with the created control schedule information. The second condition is a condition where the device to be monitored is not finished within the extension period of the waste use time slot by the user's operation. In contrast, when both the third condition and the fourth condition are satisfied, the control schedule creating means varies the time of finishing the operation of the device to be monitored within the efficiency improvement time slot to shorten the waste use time slot. The third condition is a condition where the device to be monitored operates in line with the created control schedule information. The fourth condition is a condition where the device to be monitored is finished its operation within the extension period of the waste use time slot by the user's operation. Consequently, the control schedule is improved to achieve the energy conservation.

Next, the operation of creating the control schedule of gradually decreasing an amount of the electrical consumption in the efficiency improvement time slot T3 is explained.

Firstly, as shown in FIG. 11 A, the beneficial use time slot T1 is set as the period from 8:00 to 20:00. The waste use time slot T2 is set as the period from 0:00 to 7:00 and the period from 22:00 to 24:00. The efficiency improvement time slot T31 is set as the period from 7:00 to 8:00. The efficiency improvement time slot T32 is set as the period from 20:00 to 22:00. The control schedule creating member 14d is configured to obtain the control schedule from the lighting device controlling device 5 and the air conditioner controlling device 6. The current obtained control schedule includes, as shown in FIG. 11 A, the time of 8:00 and 20:00 which are defined as the time of starting the operation of the device (which correspond to on control time) and the time of 7:00 and 22:00 which are defined as the time of finishing the operation of the device (which correspond to off control time).

If the efficiency improvement time slot T32 has a control schedule which is set to have an amount of the electrical consumption as a certain amount, the device to be monitored consumes the electrical power shown in FIG. 11 B. Therefore, in this condition, energy conservation in the efficiency improvement time slot T32 is yet to be achieved.

Then, on the basis of the fact that the obtained control schedule has the on control at 20:00 of start time of the efficiency improvement time slot T32 and the off control at 22:00 of the finish time of the efficiency improvement time slot T32, the control schedule creating member 14d creates the control schedule of gradually decreasing an amount of the electrical consumption over the period of 20:00 to 22:00. Consequently, the control schedule is improved to achieve the energy conservation. Therefore, the control schedule is further improved to achieve the energy conservation in the efficiency improvement time slot T32. Therefore, the device to be monitored uses the electrical consumption shown in FIG. 11 C. Therefore, the energy conservation in the efficiency improvement time slot T32 is achieved.

When the electrical power manager operates the input member 11, the electrical power manager is able to display "the control schedule of gradually decreasing the electrical consumption over the period of 20:00 to 22:00" to the display and confirm it. In addition, as needs, the electrical power manager sends the improved control schedule from the communication member 15 to the lighting device controlling device 5 and the air conditioner controlling device to update the control schedule stored in the lighting device controlling device 5 and the air conditioner controlling device 6.

In this manner, in this embodiment, the schedule setting rule is applied to the setting condition of each the time slot to create and improve the control schedule. Therefore, it is possible to automatically create the control schedule without additional work of the electrical power manager.

Third Embodiment

In this embodiment, the resource usage condition judgment member 14c calculates an amount of the electrical consumption which is reduced in the efficiency improvement time slot T3 of one week on the basis of the data obtained by the resource usage information acquisition member 14. The display member 12 displays an amount of the electricity which is reduced in the efficiency improvement time slot T3 of one week.

Figure 12:
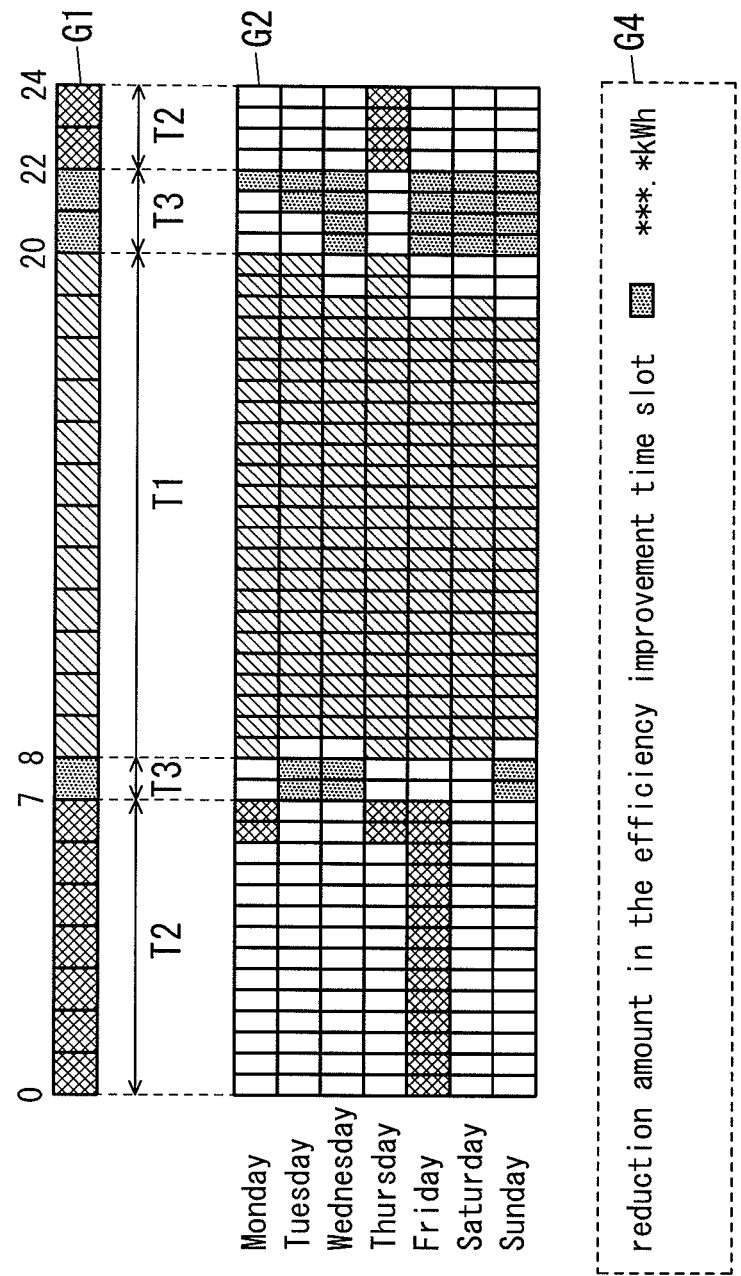
FIG. 12 shows an illustration indicating the chart which is displayed in the third embodiment.

The electricity reduced in the efficiency improvement time slot T3 of one week is calculate by the difference of a maximum amount of the electrical consumption which is usable in one week and an actual amount of the electrical consumption which is used in one week. Then, the resource usage condition judgment member 14c is, as shown in FIG. 12, configured to create the electricity reduction display member G4 below the week display member G2. The electricity reduction display member G4 displays an actual value of the electricity which is reduced in the efficiency improvement time slot T3 of one week.

When the electrical power manager operates the input member 11, the electrical power manager is able to see the displayed content of the display member 12 created as explained above. Therefore, displaying an amount of the reduction of the electricity makes it possible to enhance the consciousness regarding the energy conservation, whereby raising the awareness regarding the energy conservation is achieved.

It is noted that the components other than the above is in common with the components of the first embodiment and the second embodiment. Therefore, the explanations thereof are omitted.

Fourth Embodiment

In this embodiment, on the basis of the data of an amount of the electrical consumption obtained by the resource usage information acquisition member 14, the resource usage condition judgment member 14 judges whether or not an amount of the electrical consumption in the efficiency improvement time slot T3 is waste, and display the judgment result.

Figure 13:
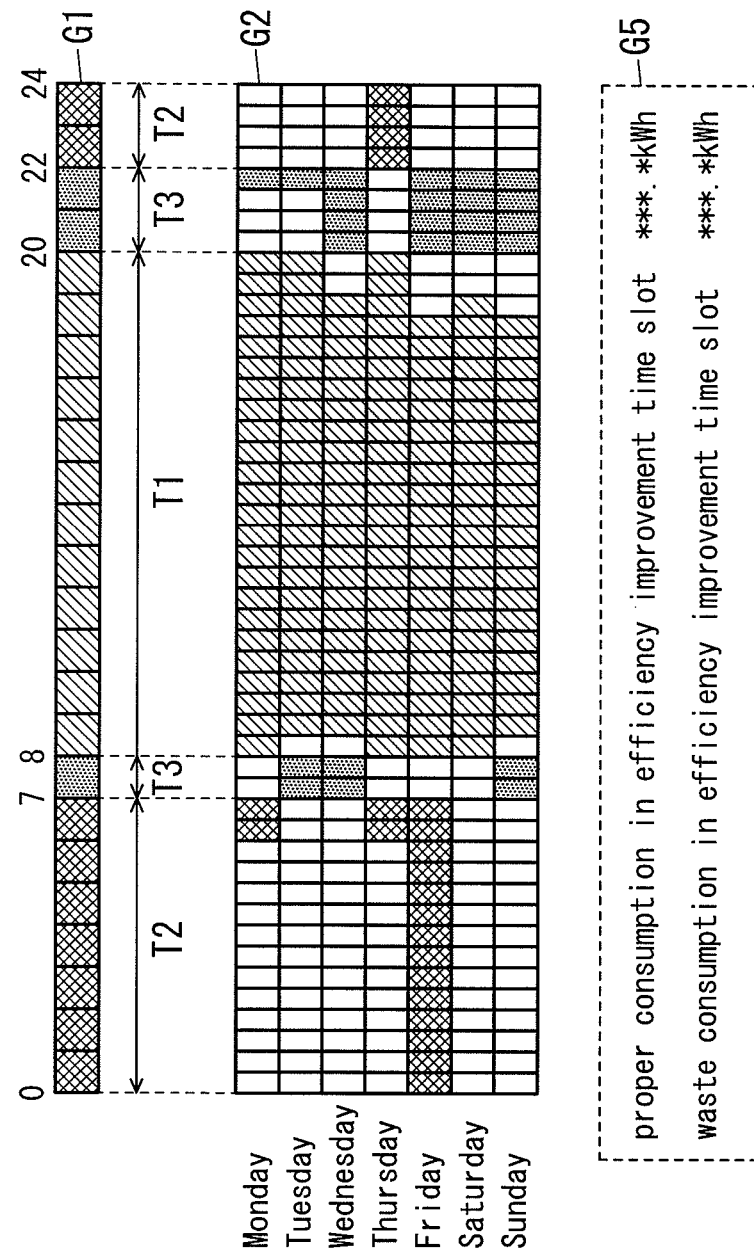
FIG. 13 shows an illustration indicating the chart which is displayed in the fourth embodiment.

Specifically, on the basis of the data of an amount of the electrical consumption obtained by the resource usage information acquisition member 14a, the resource usage condition judgment member 14c judges that an amount of the electrical consumption in the efficiency improvement time slot T3 is waste when "an amount of the electrical consumption does not become zero in once in the efficiency improvement time slot T3", or "the device to be monitored is not finished in once in the efficiency improvement time slot T3". In addition, the resource usage condition judgment member 14c obtains the measurement data of the human detectors R1, R2 from the central monitoring unit 2. Then, the resource usage condition judgment member 14c judges that an amount of the electrical consumption in the efficiency improvement time slot T3 is waste when the device to be monitored is operated in the area where there is no person in the efficiency improvement time slot T3. Then, the resource usage condition judgment member 14c is, as shown in FIG. 13, configured to create the waste electrical energy displaying member G5. The waste electrical energy displaying member G5 displays the actual value (kilowatt-hour) in the efficiency improvement time slot T3 in one week.

When the electrical power manager operates the input member 11, the electrical power manager is able to see the display content of the display member created as explained above. Therefore, displaying the waste electrical energy in the efficiency improvement time slot T3 makes it possible to easily judge the waste control content in the efficiency improvement time slot T3. Therefore, this configuration makes it possible to exactly find the point to be improved of the control schedule.

It is noted that the components other than the above are in common with the components in the first embodiment to third embodiment. Therefore, explanations thereof are omitted.

Fifth Embodiment

In this embodiment, in addition to the beneficial use time slot T1, the waste use time slot T2, and the efficiency improvement time slot T3, the time slot setting member 14b is configured to set the necessary use time slot which is regarded as the period when the device to be monitored must be used. The necessary use time slot is set to the device to be monitored such as the signboard in the night and the emergency light which are recognized as the device which must be used in a predetermined time slot.

On the basis of the data of an amount of the electrical consumption obtained by the resource usage information acquisition member 14a, the resource usage condition judgment member 14c calculates an amount of the electrical consumption in the necessary use time slot. If an amount of the electrical consumption which is calculated is below a predetermined threshold value, the resource usage condition judgment member 14 judges that the necessary use device to be monitored is not operated. (The predetermined threshold value corresponds to the standby electrical consumption.) The display member 12 is configured to display the indication which indicates the fact that the operation necessary device to be monitored is not operated. When the electrical power manager sees the display content, the electrical power manager improves the control schedule of the operation necessary device to be monitored.

Therefore, even if the electrical power manager creates the control schedule with error of easily reducing the necessary electrical power by finishing the operation of the operation necessary device to be monitored such as the signboard in the night and the emergency light since the electrical power manager tries to achieve the energy conservation, the time slot setting member 14b detects the error and inform it to the electrical power manager.

In addition, if the control content includes no start time and no finish time of the necessary use time slot in the control schedule obtained from the lighting device controlling device 5 and the air conditioner controlling device 6, the control schedule creating member 14d sets the control content of starting the operation to be monitored at the above times. Or, it is also possible to perform the above process only to the start time of the necessary use time slot.

Therefore, the control schedule allows the operation necessary device to be monitored to operate at the necessary use time slot. Therefore, it is possible to appropriately improve the operation of the device to be monitored.

When the electrical power manager operates the input member 11, the electrical power manager displays the control schedule with improvement of the operation of the device to be monitored in the necessary use time slot as explained in the above to the display, and is able to confirm it. In addition, as needs, the electrical power manager sends the improved control schedule from the communication member 15 to the lighting device controlling device 5 and the air conditioner controlling device 6 to update the control schedule stored in the lighting device controlling device 5 and the air conditioner controlling device 6.

Figure 14:
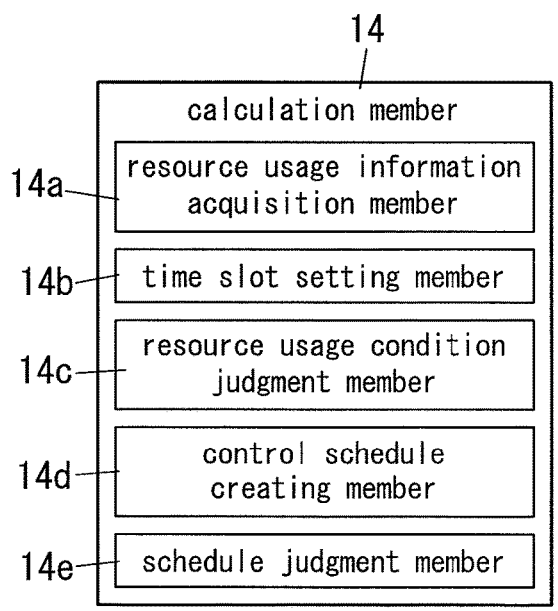
FIG. 14 shows a block diagram of the calculation member of the fifth embodiment.

Furthermore, as shown in FIG. 14, the terminal device 1 may have the calculation member 14 with the schedule judgment member 14e (schedule judgment means) to detect the error of the control schedule created by the electrical power manager.

Before the electrical power manager sends the control schedule information created by operating the input member 11 (schedule input means) from the communication member 15 to the lighting device controlling device 5 and the air conditioner controlling device 6, the schedule judgment member 14e judges the matching between each time slot which is set by the time slot setting member 14b and the created control schedule information.

For example, when the control schedule information sets the control content of finishing the operation of the device to be monitored in the necessary use time slot, the schedule judgment member 14e judges that the created control schedule information does not match with the necessary use time slot which is set by the time slot setting member 14b. The display member 12 displays the indication of indicating the mismatching of the created control schedule information and the necessary use time slot. When the electrical power manager sees the display content, the electrical power manager is able to improve the control schedule. Therefore, this configuration makes it possible for the electrical power manager to find the error of the control schedule. So, it is possible to adequately operate the device to be monitored.

In addition, the components other than the above are in common with the components of the first embodiment to the third embodiment. Therefore, explanations thereof are omitted.

In addition, in each the embodiment, the resource which is consumed by the device to be monitored is explained with the electricity. However, it is possible to apply this system to other resources such as gas. Consequently, similar effect is obtained.

REFERENCE SIGNS LIST 1 terminal device
11 input member (schedule input means)
12 display member (display means)
14a resource usage information acquisition member (resource usage information acquisition means
14b time slot setting member (time slot setting means)
14c resource usage condition judgment member (resource usage condition judgment means)
14d control schedule creating member (control schedule creating means)
14e schedule judgment member (schedule judgment means)
2 central monitoring unit
3 electrical energy monitoring device
5 lighting device controlling device
6 air conditioner controlling device
L1, L2 lighting device
AC1, AC2 air conditioner

The invention claimed is:

1. An energy conservation analysis system for monitoring a device to be monitored, said device to be monitored configured to operate according to a control schedule information, said energy conservation analysis system comprising:
a resource usage information acquisition circuit configured to acquire an usage amount of a resource in association with a usage time, the usage amount of the resource indicating an amount of the resource used by the device to be monitored which is operated according to the control schedule information;
a time slot setting circuit configured to set at least a first time slot, a second time slot, and a third time slot in a day,
said control schedule information having a start planning time for starting an operation of the device to be operated and finish planning time for finishing the operation of the device to be operated,
the first time slot being a period included in a period from after the start planning time to before the finish planning time,
the second time slot being a period included in a period from after the finish planning time to before the start planning time,
the third time slot being a period other than the first time slot and the second time slot;
a resource usage condition judgment circuit configured to calculate an amount of the usage of the resource in each one of the first time slot, the second time slot, and the third time slot which are set by said time slot setting circuit on the basis of the resource usage information acquired by said resource usage information acquisition circuit,
a display configured to display the first time slot as a time slot in which a use of the resource by the device to be monitored is beneficial, the second time slot as a time slot in which a use of the resource by the device to be monitored is wasting, the third time slot as a time slot in which a use of the resource by the device to be monitored is to be saved, and an amount of the usage of the resource in each one of the first time slot, the second time slot, and the third time slot as calculated by the resource usage condition judgment circuit.

2. The energy conservation analysis system as set forth in claim 1, wherein
when the third time slot is set between the first time slot and the second time slot and also when the device to be monitored is operated according to the control schedule information which is set to include a control content of finishing the operation of the device to be operated at a time of at least one of a start time and a finish time of the third time slot, the control schedule creating circuit is configured to shift the time for finishing the operation of the device to be monitored in the third time slot from at least one of the start time and the finish time to create the control schedule information which has the second time slot which includes an extension period, shift the time for finishing the operation of the device to be monitored in the third time slot to further extend the second time slot in a case where the device to be monitored has not finished its operation by a user's operation within the extension period of the second time slot under a condition where the device to be monitored is operated according to the control schedule information which is created, shift the time for finishing the operation of the device to be monitored in the third time slot to shorten the second time slot in a condition where the device to be monitored is finished its operation by the user's operation within the extension period of the second time period under a condition where the device to be monitored is operated according to the control schedule information which is created.

3. The energy conservation analysis system as set forth in claim 1, wherein when a control content of finishing the operation of the device to be monitored at a finish time of the third time slot is included in the control schedule information, the control schedule creating circuit is configured to create the control schedule information of operating the device to be monitored to gradually decrease an amount of the usage of the resource within the third time slot.

4. The energy conservation analysis system as set forth in claim 1, wherein the time slot setting circuit is configured to obtain the control schedule information of the device to be monitored, the time slot setting circuit is configured to set a period from after the start planning time to before the finish planning time as the first time slot, the time slot setting circuit is configured to set a period included in a period from after the finish planning time to before the start planning time as the second time slot, the time slot setting circuit is configured to set a period other than the first time slot and the second time slot as the third time slot.

5. The energy conservation analysis system as set forth in claim 1, wherein the time slot setting circuit is configured to set a period from the start planning time to the finish planning time as the first time slot, the time slot setting circuit is configured to set a period from a first time before a certain period of the start planning time to the start planning time as a first sub-time slot which is a part of the third time slot, the time slot setting circuit is configured to set a period from the finish planning time to a second time after a certain period from the finish planning time as a second sub-time slot which is a remaining part of the third time slot, the time slot setting circuit is configured to set a period other than the first time slot and the third time slot as the second time slot.

6. The energy conservation analysis system as set forth in claim 5, wherein the time slot setting circuit is configured to set a period from the start planning time to the finish planning time next to the start planning time as the first time slot.

7. The energy conservation analysis system as set forth in claim 5, wherein the time slot setting circuit is configured to set a period from a first time before a certain period of the start planning time to the start planning time next to the first time as the first sub-time slot.

8. The energy conservation analysis system as set forth in claim 5, wherein the time slot setting circuit is configured to set a period from the finish planning time to a second time which is next to the finish planning time and which is after a certain period of the finish planning time as the second sub-time slot.

9. The energy conservation analysis system as set forth in claim 1, wherein the time slot setting circuit is configured to determine a standard start time on the basis of a previous start time, the previous start time indicating a time when the device to be monitored is started in past times, the time slot setting circuit is configured to determine a standard finish time on the basis of a previous finish time, the previous finish time indicating a time when the device to be monitored is finished in past times, the time slot setting circuit is configured to set a period from the standard start time to the start planning time as a first sub-time slot which is a part of the third time slot, the time slot setting circuit is configured to set a period from the finish planning time to the standard finish time as a second sub-time slot which is a remaining part of the third time slot, the time slot setting circuit is configured to set a period other than the first time slot and the third time slot as the second time slot.

10. The energy conservation analysis system as set forth in claim 9, wherein the time slot setting circuit is configured to recognize the previous start time on the basis of the resource usage information, the time slot setting circuit is configured to recognize the previous finish time on the basis of the resource usage information.

11. The energy conservation analysis system as set forth in claim 10, wherein the time slot setting circuit is configured to recognize the previous start time when an amount of consumption of the resource exceeds a threshold value, the time slot setting circuit is configured to recognize the previous finish time when an amount of the consumption of the resource falls below the threshold value.

12. The energy conservation analysis system as set forth in claim 9, wherein said time slot setting circuit is configured to determine the standard start time on the basis of a plurality of the previous start times, said time slot setting circuit is configured to determine the standard finish time on the basis of a plurality of the previous finish times.

13. The energy conservation analysis system as set forth in claim 12, wherein said standard start time is set to a time between an earliest time among the previous start times and a latest time among the previous start times.

14. The energy conservation analysis system as set forth in claim 12, wherein the standard finish time is set to a time between an earliest time among the previous finish times and a latest time among the previous finish times.

\* \* \* \* \*